(12) United States Patent
Furusho

(10) Patent No.: US 7,514,840 B2
(45) Date of Patent: Apr. 7, 2009

(54) ELECTROSTATIC ACTUATOR

(75) Inventor: Hidetaka Furusho, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 449 days.

(21) Appl. No.: 11/261,267

(22) Filed: Oct. 27, 2005

(65) Prior Publication Data

US 2006/0108893 A1   May 25, 2006

(30) Foreign Application Priority Data

Nov. 24, 2004   (JP) .............................. 2004-338468

(51) Int. Cl.
*H02N 1/00* (2006.01)
(52) U.S. Cl. ....................... 310/309; 318/116
(58) Field of Classification Search ................ 310/309; 396/75; 348/374; 318/116
See application file for complete search history.

(56) References Cited

U.S. PATENT DOCUMENTS

| | | | | |
|---|---|---|---|---|
| 5,055,731 A | * | 10/1991 | Nihei et al. | 310/309 |
| 5,986,381 A | * | 11/1999 | Hoen et al. | 310/309 |
| 6,308,573 B1 | * | 10/2001 | Lee et al. | 73/652 |
| 6,424,504 B1 | * | 7/2002 | Abe et al. | 360/294.4 |
| 6,670,738 B2 | * | 12/2003 | Kasahara et al. | 310/309 |
| 6,713,939 B2 | * | 3/2004 | Kasahara | 310/309 |
| 6,781,279 B2 | * | 8/2004 | Lee et al. | 310/309 |
| 2001/0028203 A1 | | 10/2001 | Kasahara et al. | |

FOREIGN PATENT DOCUMENTS

| | | | |
|---|---|---|---|
| DE | 19744292 A1 | * | 4/1998 |
| JP | 63136982 | * | 6/1988 |

* cited by examiner

*Primary Examiner*—Burton Mullins
(74) *Attorney, Agent, or Firm*—Beyer Law Group LLP

(57) ABSTRACT

An electrostatic actuator includes a stator that includes a stator-side electrode group including a plurality of electrodes, a mover that includes a mover-side electrode group including a plurality of electrodes and that can move in a predetermined movement direction, this plurality of electrodes opposing the electrodes in the stator-side electrode group, a guide instrument that guides the mover, and a driving signal supply unit that generates driving signals and applies the driving signals between the stator-side electrode group and the mover-side electrode group. In one electrode group of these electrode groups, the electrodes and gaps have the same length and are alternately disposed in the movement direction, and the other electrode group includes a first group and a second group alternately disposed in the movement direction, each of the first and second groups including an electrode and a gap.

12 Claims, 15 Drawing Sheets

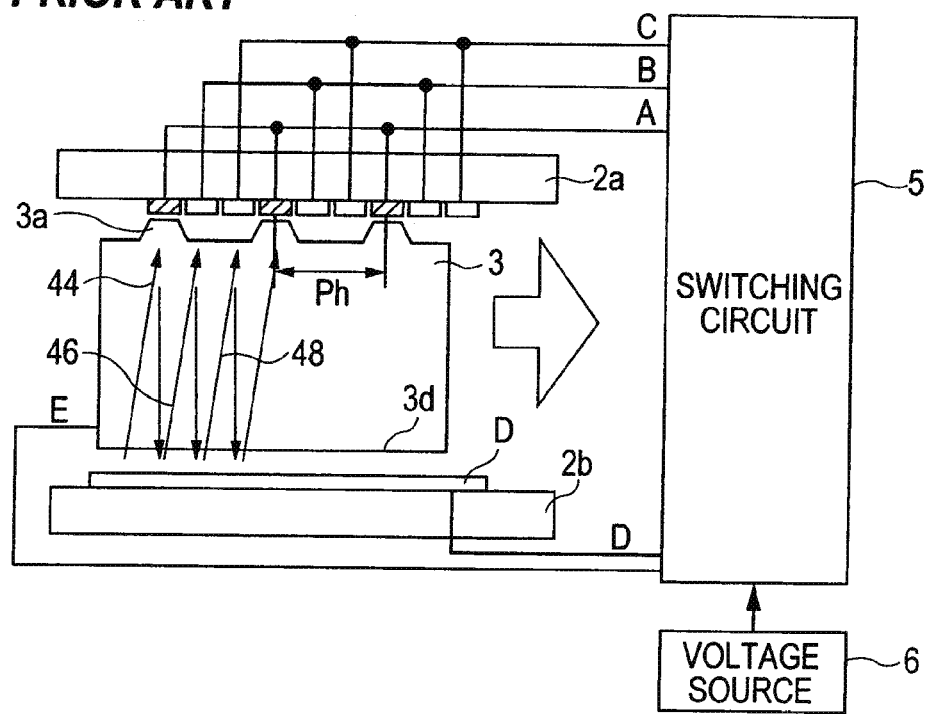
FIG. 15 *PRIOR ART*
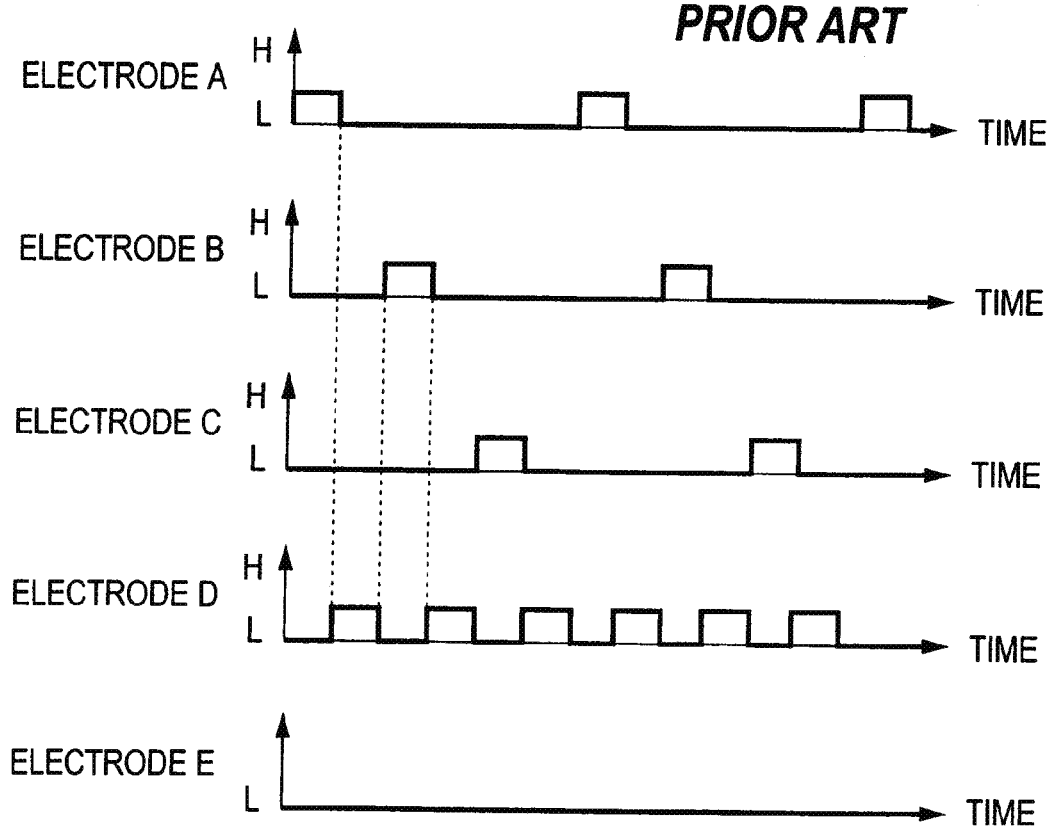
FIG. 16 *PRIOR ART*

ELECTROSTATIC ACTUATOR

BACKGROUND OF THE INVENTION

1. Field of the Invention

The present invention relates to actuators that move lenses back and forth in, for example, cameras and cellular phones, and in particular, relates to an electrostatic actuator that uses electrostatic force (coulomb force).

2. Description of the Related Art

A known electrostatic actuator is disclosed in, for example, Japanese Unexamined Patent Application Publication No. 2001-346385. FIG. 15 shows an overall structure of the electrostatic actuator shown in FIG. 1 in this document. FIG. 16 is a timing diagram showing driving signals that are applied to electrodes shown in FIG. 2 in this document.

As shown in FIG. 15, this electrostatic actuator includes a first stator 2a and a second stator 2b that are disposed so as to oppose each other with a predetermined distance therebetween and includes a slidable mover 3 that is disposed between the first stator 2a and the second stator 2b.

The first stator 2a includes three chains of electrodes A, B, and C (a first electrode group) that are sequentially disposed in a predetermined direction. The second stator 2b includes a chain of an electrode D. The mover 3 includes electrode parts 3a that are disposed on a first surface of the mover 3 so as to correspond to a pitch of each of the electrodes A, B, and C provided in the first stator 2a and includes a flat electrode part 3d that is disposed on a second surface of the mover 3 and opposes the second stator 2b. The electrode parts 3a and 3d constitute a chain of an electrode E (a third electrode) and have the same electrical potential.

As shown in FIG. 16, when a voltage is applied to the electrode A provided in the first stator 2a so that an electrical potential of the electrode A becomes higher than an electrical potential of the electrode E provided in the mover 3, the mover 3 is attracted to the first stator 2a side by electrostatic force (coulomb force) that acts between the electrodes A and E. At this time, the mover 3 is acted upon by the electrode A so that the electrode A and the electrode parts 3a exactly overlap each other because a state in which the electrode A and the electrode parts 3a exactly overlap each other is most stable. Subsequently, when a voltage is applied to the electrode D provided in the second stator 2b in turn, the mover 3 is attracted to the second stator 2b side. Furthermore, when a voltage is applied to the electrode B provided in the second stator 2b in turn, the mover 3 is acted upon by the electrode B so that the electrode B and the electrode parts 3a exactly overlap each other on the basis of the same mechanism as in the case where a voltage is applied to the electrode A. When this series of operations is repeated, i.e., a cycle of processes for sequentially applying a voltage from a voltage source 6 through a switching circuit 5 to the electrodes A, D, B, D, C, and D is repeated (a voltage is alternately applied to one of the electrodes A to C provided in the first stator 2a and the electrode D provided in the second stator 2b while the electrode to which a voltage is applied in the first stator 2a is sequentially changed in the predetermined direction described above), the mover 3 is driven in the arrangement direction (the right side direction of the drawing) of the electrodes A, B, and C arranged in the first stator 2a from a macroscopic view while the mover 3 vibrates in the vertical direction from a microscopic view.

For example, in a case where the electrostatic actuator as described above is mounted in a camera so that the electrostatic actuator is used as an actuator that moves an automatic focusing lens, as much driving force as is needed to move the lens is required, and the movement speed, the response speed, and the like of the lens need to be increased. Thus, in such an electrostatic actuator, large electrostatic force (coulomb force) needs to be generated to gain large driving force.

In general, electrostatic force is proportional to the square of an applied voltage and areas of electrodes that oppose other electrodes, and is inversely proportional to the square of the size of gaps between electrodes. Thus, large electrostatic force can be gained by setting these factors to appropriate values.

However, in a case where an applied voltage is increased, there are limitations related to batteries that can be mounted in cameras, a withstandable voltage, and the like. Moreover, in a case where the size of gaps between electrodes is decreased, there are limitations due to the accuracy of manufacturing.

Moreover, in the known electrostatic actuator, the electrodes in the first stator 2a and the second stator 2b are disposed so that plane areas of these electrodes oppose plane areas of the electrode in the mover 3. Thus, the size of the plane area of each electrode in the first stator 2a, the second stator 2b, and the mover 3 needs to be increased to increase the area of each electrode opposing another electrode. However, in this arrangement, the size of the electrostatic actuator itself is increased. Moreover, the weight of the mover 3 is increased. In spite of the original intention, the movement speed, the response speed, and the like of the mover 3 are disadvantageously decreased.

Moreover, the automatic focusing lens actuator described above moves the lens from an initial waiting position to a target position (a focusing position). In such an automatic focusing lens actuator, it is preferable that the following two types of feed be available: rough feed that shortens the time required to move the lens by increasing the movement speed of the lens upon moving the lens from the waiting position and fine feed that accurately stops the lens at the target position by decreasing the movement speed of the lens when the lens is approaching the target position.

However, the known electrostatic actuator described above has a structure in which the movement speed of the lens is not variable, and rough feed and fine feed of the lens cannot be alternately selected. Thus, it is difficult to accurately stop the lens at the target position. Moreover, when an accurate stop position of the lens is required, the lens needs to be moved back and forth several times. Thus, focusing operation requires a long time.

Moreover, a problem due to the structure exists, such that it is difficult to keep an even movement speed of the lens.

SUMMARY OF THE INVENTION

The present invention provides solutions to the problems described above, and it is an object of the present invention to provide an electrostatic actuator that can be downsized and generate large driving force.

It is another object of the present invention to provide an electrostatic actuator in which rough feed and fine feed can be alternately selected.

It is another object of the present invention to provide an electrostatic actuator in which a relatively even movement speed can be achieved by reducing variation in the movement speed when an even movement speed is required.

An electrostatic actuator according to the present invention includes a stator that includes a stator-side electrode group that includes a plurality of arranged electrodes, a mover that includes a mover-side electrode group that includes a plurality of electrodes and that can freely move in a predetermined movement direction, this plurality of electrodes opposing the individual electrodes included in the stator-side electrode group, a guide instrument that guides the mover in the movement direction, and a driving signal supply unit that generates driving signals having a predetermined number of phases and that applies the generated driving signals between the stator-side electrode group and the mover-side electrode group. In one electrode group of the stator-side electrode group and the mover-side electrode group, the electrodes and gaps have the same length in the movement direction and are alternately disposed in the movement direction, and the other electrode group includes a first group and a second group alternately disposed in the movement direction, each of the first group and the second group including an electrode and a gap.

Lengths of the first group and the second group in the movement direction may be the same.

In this case, preferably, the first group and the second group have the same length of each electrode and the same length of each gap, the length of each electrode being different from the length of each gap.

In the electrostatic actuator according to the present invention, lengths of the first group and the second group in the movement direction may be different from each other.

In this case, preferably, in a case where one pitch is defined as an interval that is obtained by adding the length of the first group in the movement direction and the length of the second group in the movement direction, a set of the electrodes and the gaps within the one pitch is repeatedly disposed in the movement direction in the other electrode group.

Moreover, preferably, the electrodes included in the one electrode group and the electrodes included in the other electrode group have different lengths.

The electrostatic actuator according to the present invention may employ a drive system in which electrodes are disposed at even intervals or another drive system in which electrodes are disposed at uneven intervals.

In the case where one pitch is defined as an interval that is obtained by adding the length of the first group in the movement direction and the length of the second group in the movement direction, the first group and the second group being provided in the other electrode group, the one electrode group may include n electrodes, where n is an even number other than zero, within an interval corresponding to the one pitch, and the number of phases of the driving signal supply unit may be n or n/2.

For example, when n=8, fine feed may be selected. When n=4, rough feed may be selected.

An amount of movement of the mover each time the driving signals are applied may be an integral multiple of the length of the electrodes included in the one electrode group.

The one electrode group may be the mover-side electrode group, and the other electrode group may be the stator-side electrode group.

Both side faces of the individual electrodes included in the mover-side electrode group may oppose the individual electrodes included in the stator-side electrode group, the both side faces being oriented in the width direction perpendicular to the movement direction.

Thus, the electrostatic actuator according to the present invention can be downsized and generate large driving force.

Moreover, in the electrostatic actuator according to the present invention, rough feed and fine feed of the mover are available and can be alternately selected, as required.

Moreover, in the electrostatic actuator according to the present invention, an even feed speed of the mover can be achieved, i.e., a relatively even movement speed can be achieved by reducing variation in the movement speed.

BRIEF DESCRIPTION OF THE DRAWINGS

FIG. 7 includes views showing basic operation of the electrostatic actuator.

FIG. 8 includes views showing basic operation of the electrostatic actuator according to the first embodiment.

FIG. 11 includes views showing basic operation of the electrostatic actuator according to the second embodiment.

FIG. 14 includes views showing basic operation of the electrostatic actuator according to the third embodiment.

FIG. 15 shows an overall structure of a known electrostatic actuator; and

FIG. 16 is a timing diagram showing driving signals that are applied to electrodes provided in the known electrostatic actuator.

DESCRIPTION OF THE PREFERRED EMBODIMENTS

Figure 1:
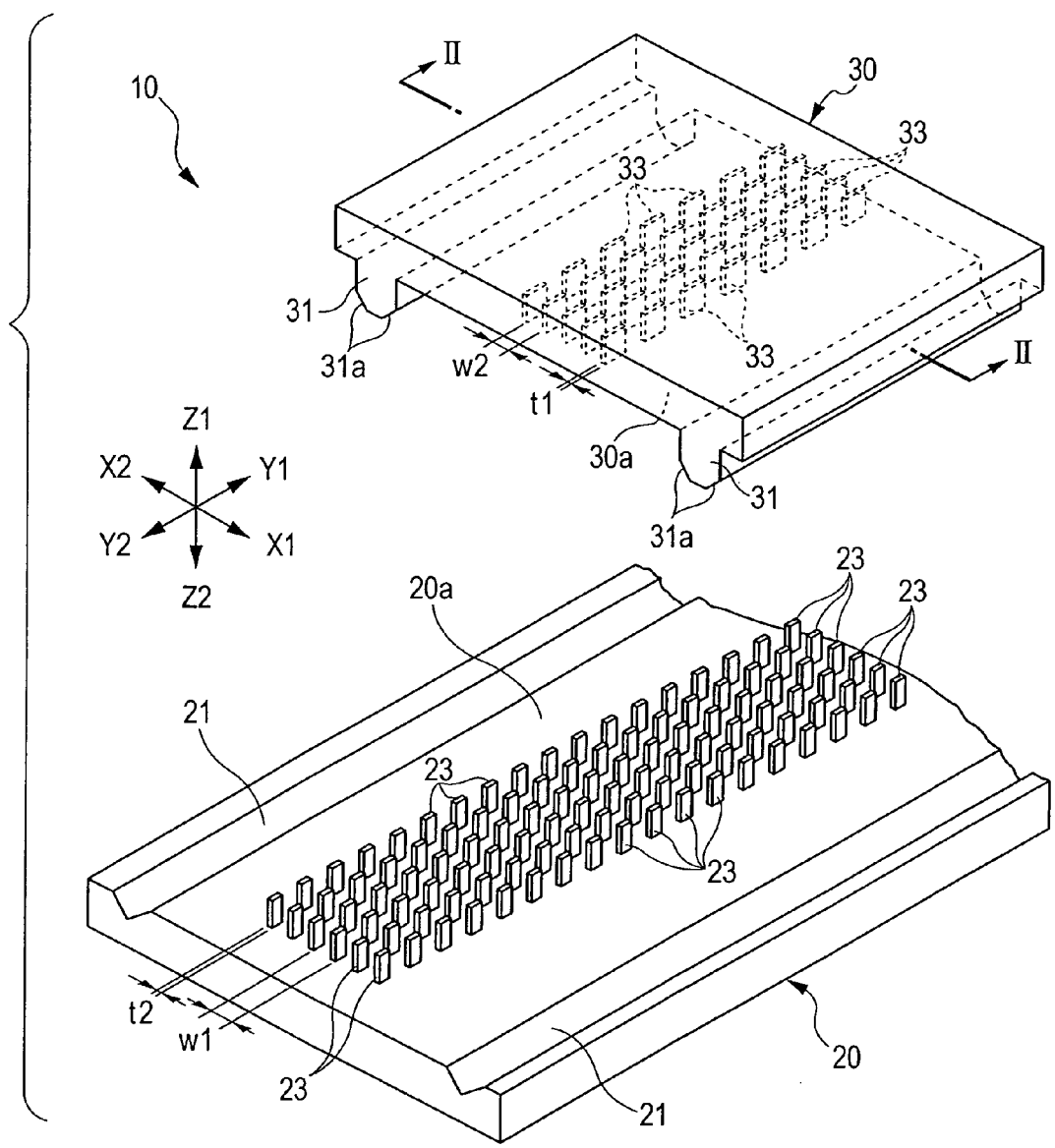
FIG. 1 is an exploded perspective view showing an electrostatic actuator according to the present invention.
Figure 2:
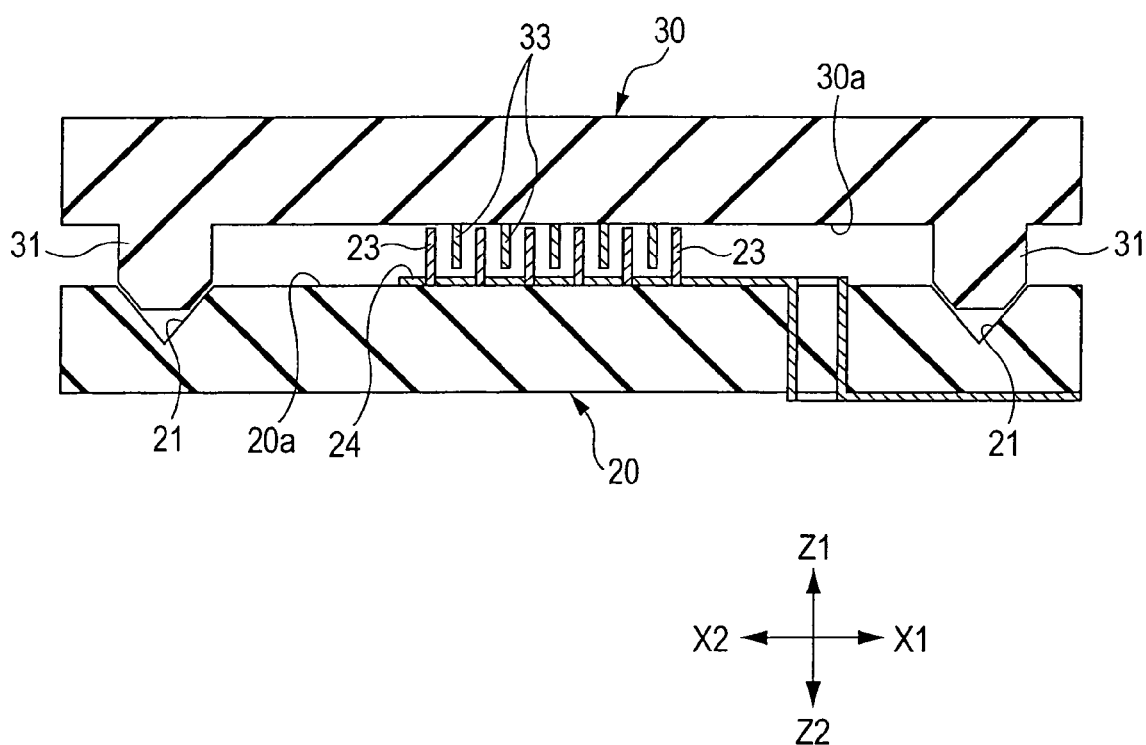
FIG. 2 is a sectional view taken along line II-II in FIG. 1 showing a state in which a stator and a mover oppose each other.
Figure 3:
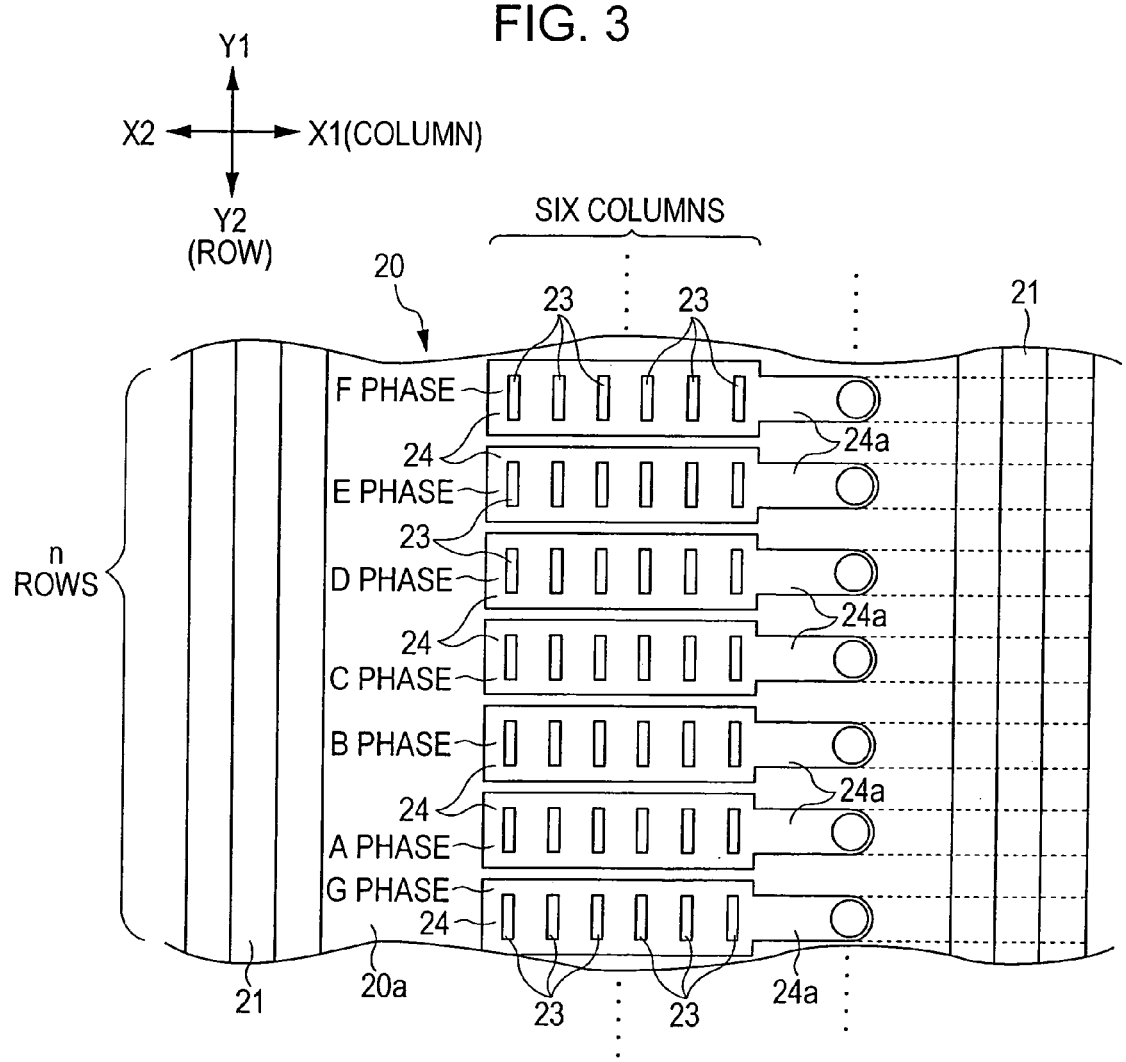
FIG. 3 is a plan view partially showing the structure of the stator.
Figure 4:
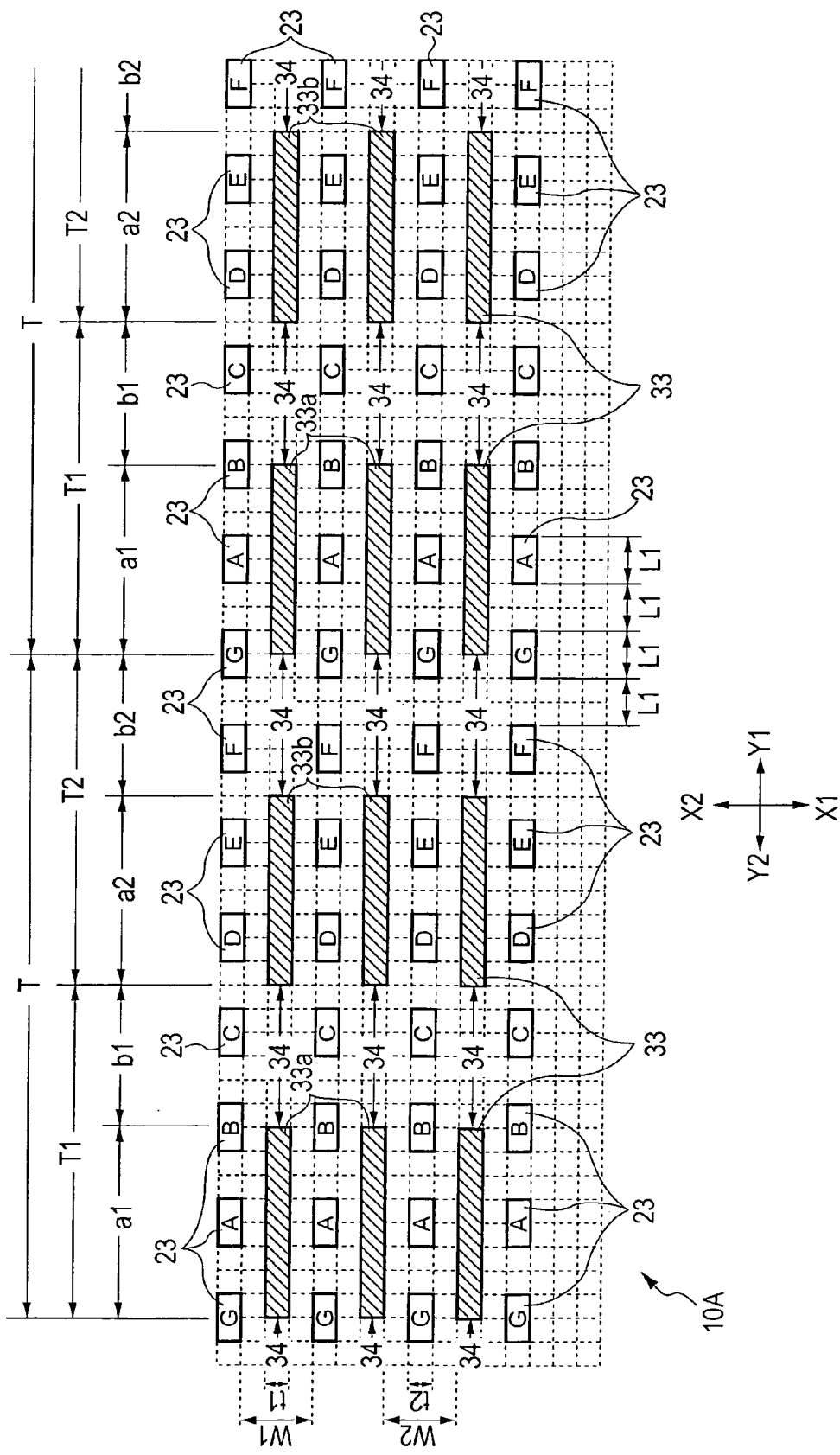
FIG. 4 is a plan view showing relationships between electrodes on a stator side and electrodes on a mover side in an electrostatic actuator according to a first embodiment of the present invention.

FIG. 1 is an exploded perspective view showing an electrostatic actuator according to the present invention. FIG. 2 is a sectional view taken along line II-II in FIG. 1 showing a state in which a stator and a mover oppose each other. FIG. 3 is a plan view partially showing the structure of the stator. FIG. 4 is a plan view showing relationships between electrodes on the stator side and electrodes on the mover side in the electrostatic actuator according to a first embodiment of the present invention. Hereinafter, in the drawings, the Y direction indicates the movement direction, the X direction indicates the width direction, and the Z direction indicates the height direction.

As shown in FIG. 1, the electrostatic actuator 10 according to the present invention includes the stator 20 disposed at the Z2 side of the height direction shown in FIG. 1 and the mover 30 disposed at the Z1 side.

The stator 20 is a planar member that extends in the Y direction, which is the movement direction, and is composed of insulating material such as silicon. A pair of V-shaped guide grooves 21 that extend in parallel in the movement direction (the Y direction) are provided on both ends in the width direction (the X direction) of a counter surface (a stator-side counter surface) 20a of the stator 20. The counter surface 20a is oriented in the Z1 direction. The surface of each guide groove 21 is a flat and smooth surface that has small frictional resistance.

In the movement direction (the Y direction), the length of the mover 30 is shorter than the length of the stator 20. The mover 30 is composed of conductive material, and the lower surface of the mover 30 is a counter surface (a mover-side counter surface) 30a that is oriented in the Z2 direction. Alternatively, the mover 30 may be composed of insulating material such as silicon, and a conductive plate may be laminated on the lower surface (at the Z2 side) of the mover 30 as the counter surface 30a.

A pair of guide protrusions 31 that protrude in the Z2 direction and extend in parallel in the movement direction (the Y direction) are provided on both ends in the width direction (the X direction) of the counter surface 30a of the mover 30. A pair of trapezoidal counter parts 31a that oppose the respective guide grooves 21 are formed at edges of the guide protrusions 31. The surface of each counter part 31a is also a flat and smooth surface that has small frictional resistance.

As shown in FIG. 2, the electrostatic actuator 10 is formed by disposing the counter surface 20a of the stator 20 and the counter surface 30a of the mover 30 so that the counter surfaces 20a and 30a oppose each other and the counter parts 31a of the guide protrusions 31 fit in the guide grooves 21. In this state, the mover 30 can be moved linearly in the Y direction (the movement direction) by applying force in the movement direction to the mover 30. That is to say, in this embodiment, the guide grooves 21 and the guide protrusions 31 function as guide instruments that guide the mover 30 in the movement direction.

As shown in FIG. 1, a stator-side electrode group that includes a plurality of planar electrodes 23 is provided on the counter surface 20a of the stator 20.

For example, conductive metals such as copper are vertically grown in the Z direction by epitaxial plating and form the electrodes 23. Each electrode 23 is oriented so that wide electrode planes of the electrode 23 are parallel to the movement direction (the Y direction), i.e., the electrode planes are perpendicular to the width direction. These electrodes 23 are arranged in an orderly manner at regular intervals on the counter surface 20a in the movement and width directions.

In the embodiment shown in FIG. 3, n rows, each row including six columns of electrodes 23 disposed in the X direction (the width direction), are formed at predetermined intervals in the Y direction (the movement direction). That is to say, a stator-side electrode group including n rows and six columns of the electrodes 23 is formed. The arrangement of the stator-side electrode group is not limited to n rows and six columns, and the stator-side electrode group may include more or less elements.

There are n rows of conductive parts 24, in the Y direction, provided on the counter surface 20a of the stator 20, i.e., a base of the electrodes 23. Each conductive part 24 extends in the X direction. For each row, each conductive part 24 is electrically connected to six electrodes 23 (six rows) so that these electrodes 23 have the same electrical potential. However, any two conductive parts 24 adjacent to each other in the movement direction (the Y direction) are electrically isolated from each other. The conductive parts 24 extend outside the stator 20 so that predetermined driving signals can be supplied from a driving signal supply unit (not shown) provided outside the stator 20 to the individual conductive parts 24.

The electrostatic actuator according to the first embodiment shown in FIGS. 3 and 4 is a seven-phase drive electrostatic actuator 10A that includes seven-phase electrode arrays to which driving signals are supplied. Each seven-phase electrode array includes an A-phase electrode, a B-phase electrode, a C-phase electrode, a D-phase electrode, an E-phase electrode, an F-phase electrode, and a G-phase electrode, these electrodes corresponding to the respective conductive parts 24, i.e., the respective rows provided in the Y direction.

On the other hand, as shown in FIG. 1, a mover-side electrode group that includes a plurality of planar electrodes 33 is provided on the counter surface 30a of the mover 30. Conductive metals such as copper are vertically grown in the Z direction by epitaxial plating and form the electrodes 33, as in the case of the stator 20 described above. These electrodes 33 are arranged in an orderly manner at predetermined intervals in the movement and width directions. Wide electrode planes of each electrode 33 are parallel to the movement direction (the Y direction). In this embodiment shown in FIG. 1, seven rows and five columns of the electrodes 33 are provided on the counter surface 30a of the mover 30.

As shown in FIGS. 2 and 4, when any electrode 33 on the mover 30 side is fitted between any two electrodes 23, on the stator 20 side, adjacent to each other in the width direction, the electrodes 23 on the stator 20 side and the electrodes 33 on the mover 30 side are arranged so that electrode planes of the electrodes 23 and electrode planes of the electrodes 33 oppose each other and are oriented in the width direction (the X direction).

In the first embodiment shown in FIG. 4, an inter-electrode distance W1 between any two adjacent electrodes 23 on the stator 20 side in the width direction is larger than a thickness t1 of each electrode 33 on the mover 30 side in the width direction. Similarly, an inter-electrode distance W2 between any two adjacent electrodes 33 on the mover 30 side in the width direction is larger than a thickness t2 of each electrode 23 on the stator 20 side in the width direction.

At the side of the stator 20 according to the first embodiment, the length of each electrode 23 in the movement direction, and the length of a gap between any two adjacent electrodes 23 in the movement direction are both L1.

On the other hand, at the side of the mover 30, first electrodes 33 and first gaps 34 form a first group, and second electrodes 33 and second gaps 34 form a second group. The length of the first electrodes 33 in the movement direction is a1, and the length of the first gaps 34 in the movement direction is b1. The length of the second electrodes 33 in the movement direction is a2, and the length of the second gaps 34 in the movement direction is b2. Thus, the total length T1 of the first group in the movement direction is obtained by adding the lengths a1 and b1 (T1=a1+b1), and the total length T2 of the second group in the movement direction is obtained by adding the lengths a2 and b2 (T2=a2+b2).

The length T that is obtained by adding the total length T1 of the first group in the movement direction and the total length T2 of the second group in the movement direction is one pitch (a pitch of one cycle) in this embodiment. One seven-phase electrode array that includes A-phase to G-phase electrodes is disposed within this one pitch.

In the first embodiment, the total length T1 of the first group in the movement direction is the same as the total length T2 of the second group in the movement direction (T1=T2). The length a1 of the first electrodes 33 is the same as the length a2 of the second electrodes 33 (a1=a2). The length b1 of the first gaps 34 is the same as the length b2 of the second gaps 34 (b1=b2). However, the length of the first and second electrodes 33 is different from the length of the first and second gaps 34 (a1(=a2) ≠b1(=b2)).

When the total length T1 of the first group is the same as the total length T2 of the second group, i.e., when one group and another group that are adjacent to each other in the movement direction have the same length, this drive system is referred to as a drive system in which electrodes are disposed at even intervals.

Thus, the electrostatic actuator 10A shown as the first embodiment in FIG. 4 is a seven-phase drive electrostatic actuator in which electrodes are disposed at even intervals.

As shown in FIG. 2, the height of the electrodes 23 on the stator 20 side in the Z direction and the height of the electrodes 33 on the mover 30 side in the Z direction are adjusted so that edges of the electrodes 23 and edges of the electrodes 33 are not in contact with the counter surface 30a and the counter surface 20a, respectively, in a state in which the stator 20 and the mover 30 are assembled together.

In the state shown in FIGS. 2 and 4, electrode planes of the electrodes 23 on the stator 20 side and electrode planes of the electrodes 33 on the mover 30 side are disposed so as to be in parallel and oppose each other. Thus, when an electrical potential difference is generated between the electrodes 23 and 33, capacitors are formed at individual portions where the electrode planes of the electrodes 23 and 33 oppose each other.

In the electrostatic actuator according to this embodiment, the electrodes 23 on the stator 20 side and the electrodes 33 on the mover 30 side are disposed so as to oppose each other. Thus, areas, opposing each other, of electrodes (the electrodes 23 and 33) that constitute capacitors can be enlarged as compared with the known electrostatic actuator. Accordingly, large electrostatic attraction force can be generated between electrodes as described below, and the mover 30 can be driven with large driving force.

Figure 5:
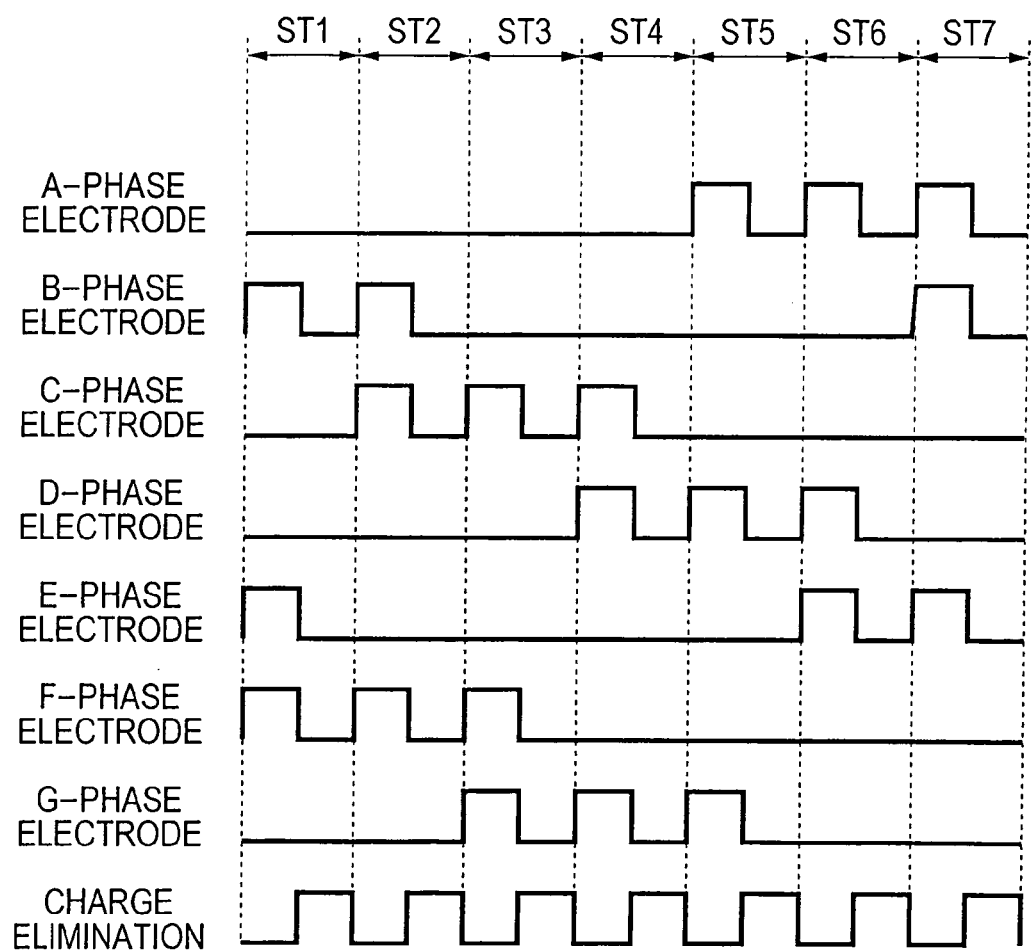
FIG. 5 is a timing diagram showing typical driving signals that are supplied to the electrostatic actuator according to the first embodiment.
Figure 6:
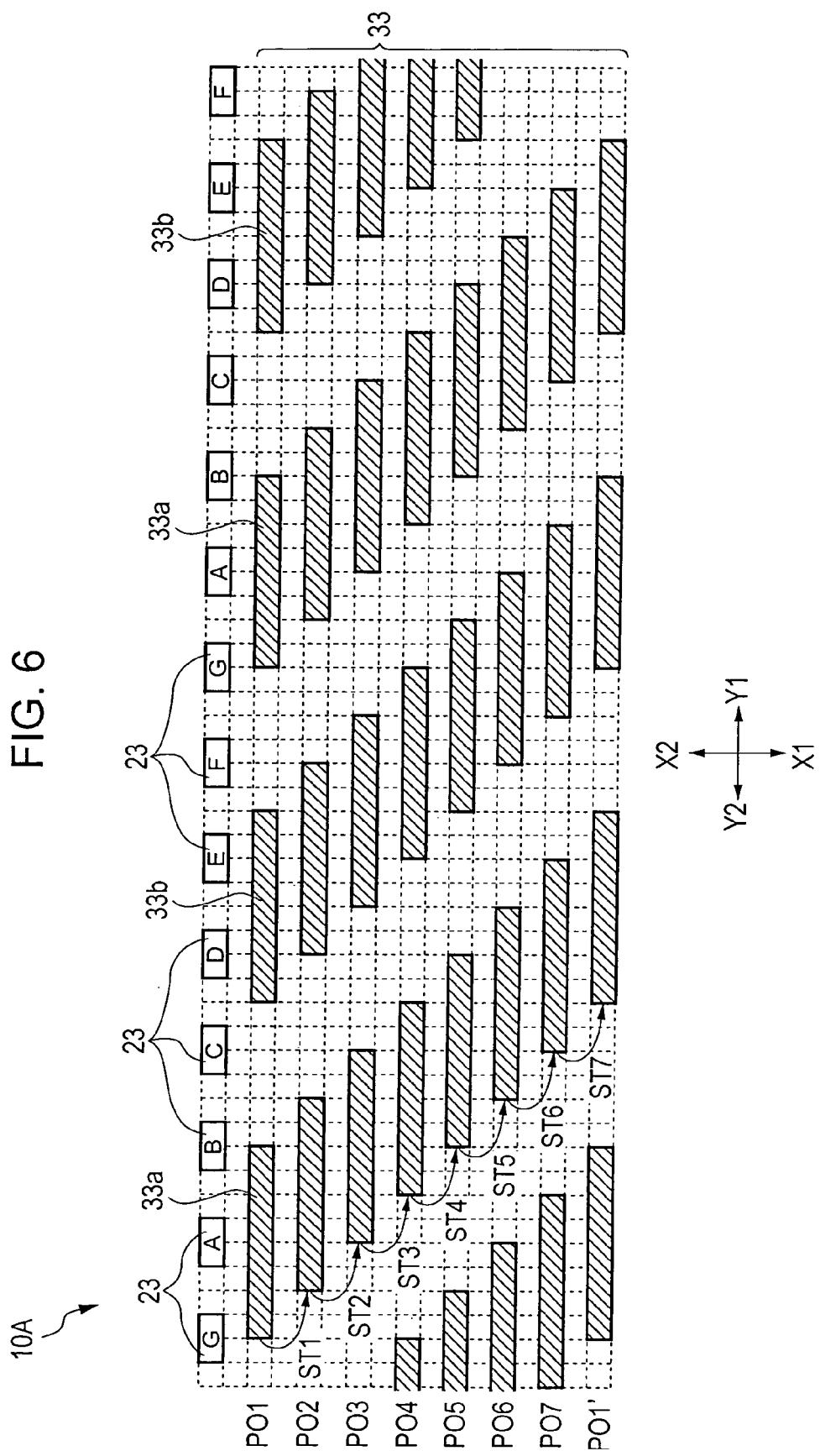
FIG. 6 is a plan view showing operation of the mover provided in the electrostatic actuator according to the first embodiment in individual steps.
Figure 7A:
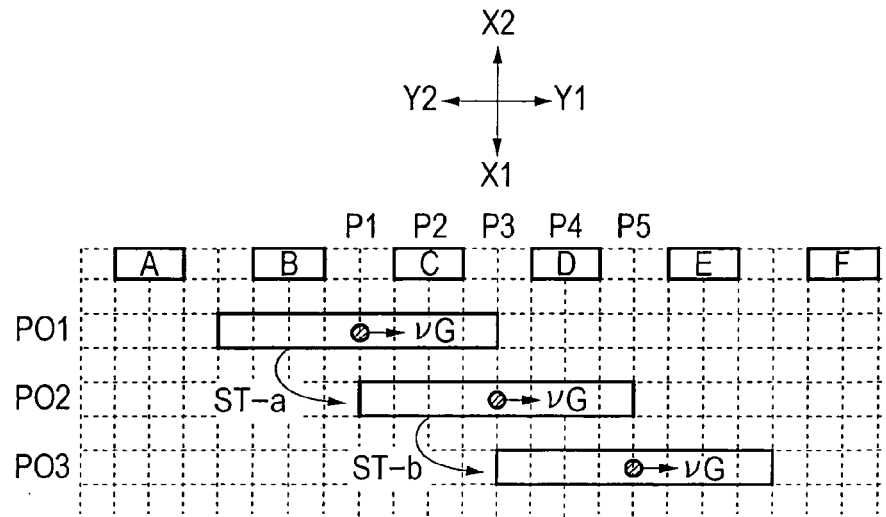
FIG. 7A is a plan view showing operation of the mover in individual steps.
Figure 7B:
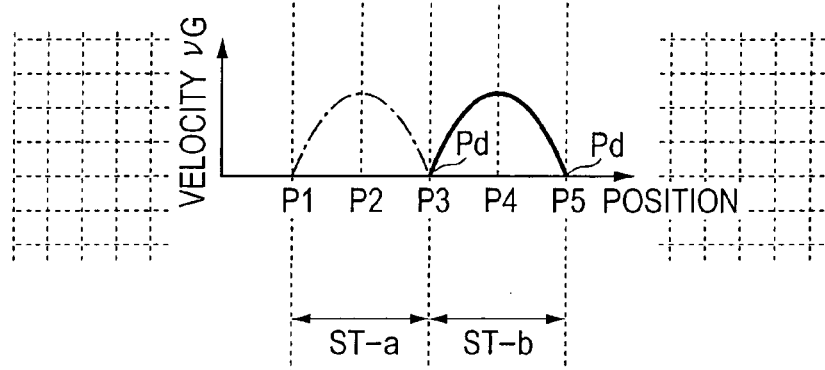
FIG. 7B is a chart showing a change in a center velocity in the mover in the individual steps.
Figure 7C:
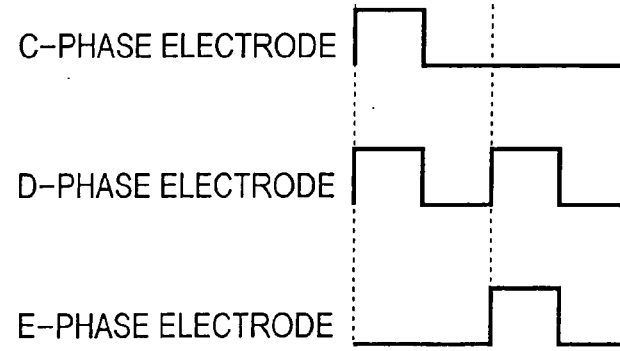
FIG. 7C is a timing diagram showing driving signals in the individual steps.
Figure 8A:
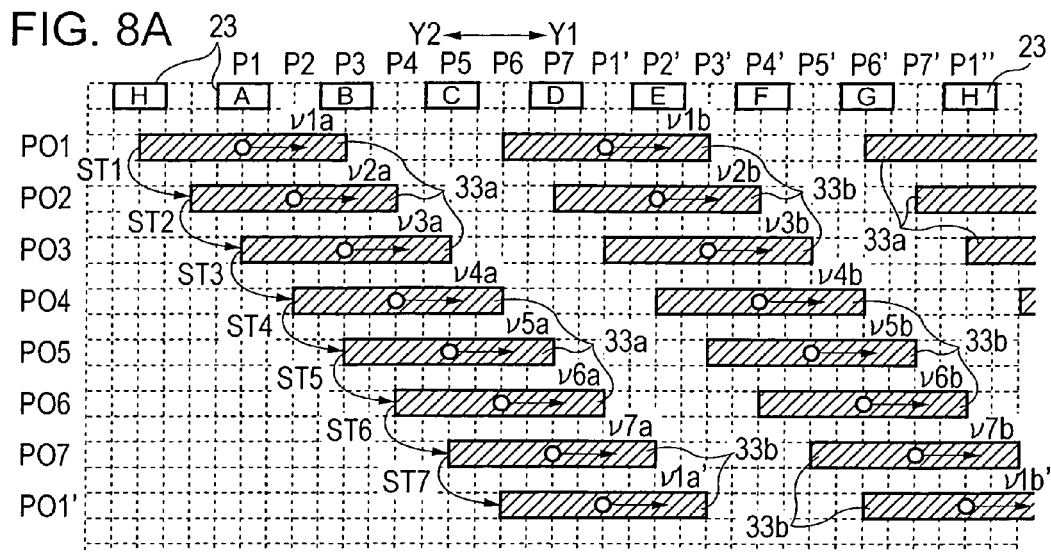
FIG. 8A is a plan view showing operation of the mover in individual steps.
Figure 8B:
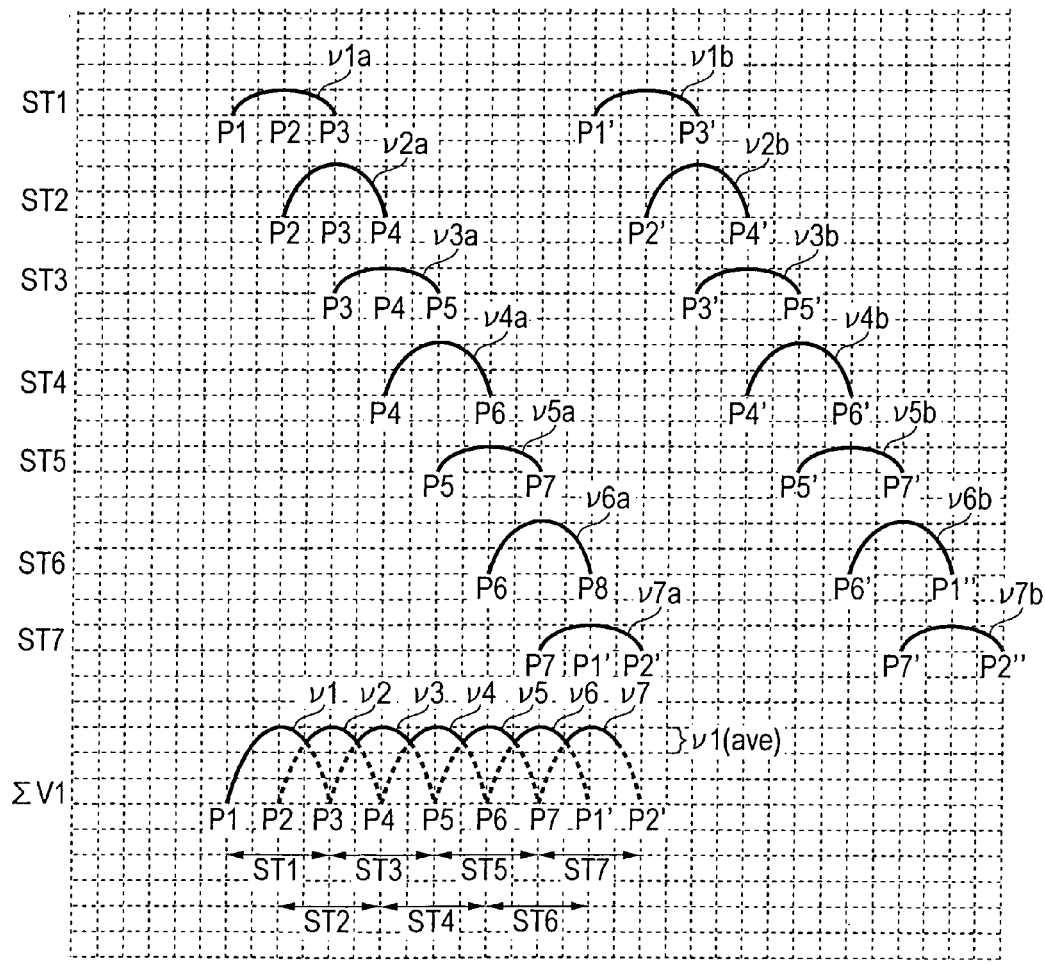
FIG. 8B is a chart showing changes in center velocities in the mover in the individual steps.

FIG. 5 is a timing diagram showing typical driving signals that are supplied to the electrostatic actuator according to the first embodiment. FIG. 6 is a plan view showing operation of the mover provided in the electrostatic actuator according to the first embodiment in individual steps shown in FIG. 5. FIG. 7 includes views showing general basic operation of the electrostatic actuator. FIG. 7A is a plan view showing operation of the mover in individual steps. FIG. 7B is a chart showing a change in a center velocity in the mover in the individual steps shown in FIG. 7A. FIG. 7C is a timing diagram showing driving signals in the individual steps shown in FIG. 7A. FIG. 8 includes views showing basic operation of the electrostatic actuator 10A according to the first embodiment. FIG. 8A is a plan view showing operation of the mover in individual steps. FIG. 8B is a chart showing changes in center velocities in the mover in the individual steps shown in FIG. 8A. In FIGS. 6, 7A, and 8A, one of two electrodes 23 of the stator 20 is not shown, the two electrodes 23 being disposed at both sides of one electrode 33 of the mover 30 in the width direction (the X direction) so as to oppose this electrode 33. Although the electrodes 33, which constitute a mover-side electrode group, are all electrically connected to each other, the electrodes 33 are alternately described as electrodes 33a and electrodes 33b on the mover 30 side, as viewed from the Y2 side shown in the drawings, for the sake of the illustration. Each step is referred to by a character string including "ST" and a succeeding suffix number, for example, ST1. Phase types of the individual electrodes 23 on the stator 20 side, i.e., A-phase to G-phase types, are referred to by characters A to G.

As shown in FIG. 5, a driving signal supply unit (not shown) applies predetermined driving signals to the electrodes 23, on the stator 20 side, of A-phase to G-phase types. In step ST1, voltages are applied to the B-phase electrodes, the E-phase electrodes, and the F-phase electrodes. In step ST2, voltages are applied to the B-phase electrodes, the C-phase electrodes, and the F-phase electrodes. In step ST3, voltages are applied to the C-phase electrodes, the F-phase electrodes, and the G-phase electrodes. In step ST4, voltages are applied to the C-phase electrodes, the D-phase electrodes, and the G-phase electrodes. In step ST5, voltages are applied to the A-phase electrodes, the D-phase electrodes, and the G-phase electrodes. In step ST6, voltages are applied to the A-phase electrodes, the D-phase electrodes, and the E-phase electrodes. In step ST7, voltages are applied to the A-phase electrodes, the B-phase electrodes, and the E-phase electrodes. In a case where the mover 30 moves in the Y1 direction, a cycle of these steps is repeated in order of ST1, ST2, ST3, ST4, ST5, ST6, and ST7.

Now, for example, it is assumed that the electrostatic actuator 10A is in an initial state shown in FIG. 4 and PO1 in FIG. 6, i.e., a side face of each electrode 33a on the mover 30 side opposes a right half of a side face at the Y1 side of each G-phase electrode, a full side face of each A-phase electrode, and a left half of a side face at the Y2 side of each B-phase electrode, and a side face of each electrode 33b on the mover 30 side opposes a full side face of each D-phase electrode and a full side face of each E-phase electrode.

In this initial state PO1, when the driving signals shown in step ST1 are applied to the A-phase to G-phase electrodes, electrostatic attraction force (coulomb force) acts between the electrodes 33a on the mover 30 side and the B-phase electrodes, and electrostatic attraction force (coulomb force) also acts between the electrodes 33b on the mover 30 side and the E-phase and F-phase electrodes. These electrostatic attraction forces cause the mover 30 to be wholly moved a moving distance L1 in the Y1 direction. At this time, the mover 30 is put to a most stable state PO2, i.e., a state in which a side face of each electrode 33a on the mover 30 side opposes a full side face of each A-phase electrode and a full side face of each B-phase electrode on the stator 20 side, and a side face of each electrode 33b on the mover 30 side opposes a right half of a side face at the Y1 side of each D-phase electrode, a full side face of each E-phase electrode, and a left half of a side face at the Y2 side of each F-phase electrode on the stator 20 side.

Similarly, when the driving signal supply unit (not shown) applies the driving signals shown in step ST2 to the electrostatic actuator 10A in the state PO2, the electrodes 33a and 33b of the mover 30 are put to a state PO3 in which the electrodes 33a and 33b are further moved the moving distance L1 in the Y1 direction. Furthermore, when the driving signals are sequentially applied to the electrostatic actuator 10A in steps ST3, ST4, ST5, and ST6, the mover 30 is moved the moving distance L1, which is the same as the length of the electrodes 23 on the stator 20 side, in the Y1 direction each time the driving signals are applied, and is sequentially put to states PO4, PO5, PO6, and PO7. Then, when the driving signals shown in step ST7 are applied to the electrostatic actuator 10A in the state PO7, the electrodes 33a and 33b of the mover 30 are put to a state PO1' that is the same as the initial state PO1.

As described above, the mover 30 can be moved the length T (=T1+T2) in the Y1 direction, the length T corresponding to one pitch described above, by sequentially applying the driving signals in steps ST1 to ST7 shown in FIG. 5 to the electrodes 23 of A-phase to G-phase types on the stator 20 side. The mover 30 can be sequentially moved in the movement direction (the Y1 direction) by sequentially repeating a series of operations in steps ST1 to ST7.

On the basis of the same operating principle, for example, the mover 30 can be sequentially moved in an opposite direction (the Y2 direction) to the movement direction (the Y1 direction) by performing the series of operations in steps ST1 to ST7 in reverse order, i.e., ST7, ST6, ST5, ST4, ST3, ST2, and ST1.

In the operations described above, as shown in FIG. 5, it is preferable that electrical charges built up in the mover 30 be eliminated each time voltages are applied in each step, i.e., it is preferable that electrical charges built up in the mover 30 be eliminated during a transition period between steps. That is to say, when a voltage of a "H" level is applied to the electrodes 23 on the stator 20 side, the electrodes 23 on the stator 20 side have positive charges, and negative charges are induced to the electrodes 33 on the mover 30 side. Thus, capacitors are formed between the electrodes 23 on the stator 20 side and the electrodes 33 on the mover 30 side. However, even when the voltage of the electrodes 23 on the stator 20 side is decreased to a "L" level, the electrodes 33 on the mover 30 side remain negatively charged. Thus, when electrical charges built up in the mover 30 are not eliminated, the movement speed, the response speed, and the like of the mover 30 may disadvantageously decrease.

To solve this problem, the mover 30 needs to be grounded so as to have a ground potential in each step to discharge built-up electrical charges to a ground side. However, when the mover 30 remains grounded, it is hard that necessary negative charges are induced to the electrodes 33 on the mover 30 side, and electrostatic attraction force may decrease.

Accordingly, it is preferable that electrical charges built up in the mover 30 be eliminated with a charge elimination signal shown in FIG. 5 just when the voltage of the driving signals is changed from the "H" level to the "L" level in each step. Built-up electrical charges can be eliminated with switching elements such as transistors or the like. The electrical charges built up in the mover 30 may be discharged to the ground side through a resistor that has a predetermined resistance value. This resistance value is determined by the relationship between a time constant RC consisting of the product of capacitance and resistance values of the capacitors and the length of a period in which the voltage is at the "L" level. This resistance value is preferably set so that the built-up electrical charges are sufficiently discharged within the period in which the voltage is at the "L" level.

The general basic operation of the electrostatic actuator 10 will now be described with reference to FIGS. 7A, 7B, and 7C. For example, in a state PO1 shown in FIG. 7A, one electrode 33 on the mover 30 side opposes two electrodes 23 of B-phase and C-phase types on the stator 20 side. In this state PO1, when driving signals are applied to the C-phase electrode and a D-phase electrode that is disposed at the Y1 side of the C-phase electrode in step ST-a, as shown in FIG. 7C, the electrode 33 on the mover 30 side is attracted by electrostatic attraction force and is put to a state PO2 in which the electrode 33 is moved to a position that opposes the C-phase electrode and the D-phase electrode on the stator 20 side, to which the driving signals are applied.

Similarly, in the state PO2, when driving signals are applied to the D-phase electrode and an E-phase electrode in step ST-b, the electrode 33 on the mover 30 side is put to a state PO3 in which the electrode 33 is moved to a position that opposes the D-phase electrode and the E-phase electrode on the stator 20 side, to which the driving signals are applied.

At this time, as shown in FIG. 7B, the center velocity $V_G$ in the electrode 33 on the mover 30 side behaves like a quadratic function between the state PO1 and the state PO2, and between the state PO2 and a state PO3. Thus, in a general drive system described above in which a set of two electrodes 23 to which driving signals are applied is sequentially changed, variation in the velocity of the mover 30 is large. Thus, it is difficult to keep an even movement speed.

In FIG. 7B, when the electrode 33 on the mover 30 side moves from a position P1 to a position P2 and from a position P3 to a position P4, the center velocity $V_G$ increases (the acceleration is positive). On the other hand, when the electrode 33 on the mover 30 side moves from the position P2 to the position P3 and from the position P4 to a position P5, the center velocity $V_G$ decreases (the acceleration is negative). The center velocity $V_G$ is zero at the positions P3 and P5. Thus, what are called dead points Pd occur, and a knocking phenomenon in which a sudden start and stop of movement is repeated occurs in the moving mover 30.

However, as shown in FIGS. 8A and 8B, in the drive system of the electrostatic actuator 10A according the first embodiment described above, in a state PO1, when driving signals are applied to a B-phase electrode, an E-phase electrode, and an F-phase electrode in step ST1, a center velocity v1a, shown in a column at the left side of a row for step ST1, occurs in each electrode 33a, which is attracted only by the B-phase electrode, and a center velocity v1b, shown in a column at the right side of the row for step ST1, occurs in each electrode 33b, which is attracted by the E-phase and F-phase electrodes. The center velocities v1a and v1b indicate velocities that occur in the electrode 33a and the electrode 33b, respectively, in a case where driving signals are separately and independently applied to the corresponding electrodes. Thus, a center velocity v1 that occurs in the mover 30 as a whole in step ST1 is obtained by adding the center velocities v1a and v1b, which respectively occur in the electrode 33a and the electrode 33b, i.e., v1=v1a+v1b. In this case, the center velocity v1b is generated by electrostatic attraction forces of two electrodes, and the center velocity v1a is generated by electrostatic attraction force of one electrode. The relationship between magnitudes of the center velocities v1a and v1b is represented by expression v1a<v1b.

Similarly, in a state PO2, when driving signals are applied to the B-phase electrode, a C-phase electrode, and the F-phase electrode in step ST2, a center velocity v2a, shown in a column at the left side of a row for step ST2, occurs in the electrode 33a, which is attracted by the B-phase and C-phase electrodes, and a center velocity v2b, shown in a column at the right side of the row for step ST2, occurs in the electrode 33b, which is attracted by the F-phase electrode. Thus, a center velocity v2 that occurs in the mover 30 as a whole in step ST2 (between positions P2 and P4) is obtained by adding the center velocities v2a and v2b, i.e., v2=v2a+v2b.

Similarly, center velocities that occur in the mover 30 as a whole in steps ST3 to ST7 are adjusted and indicated by v3, v4, v5, v6, and v7, respectively, shown in the lower row for ΣV1 of FIG. 8B.

In this case, the center velocity v1a is generated between the positions P1 and P3, and the center velocity v1b is generated between positions P1' and P3'. These velocities are generated as the center velocity v1 (=v1a+v1b) in the mover 30 as a whole. Thus, the center velocity v1 is assumed to be generated between the positions P1 and P3. Similarly, the center velocity v2 is assumed to be generated between the positions P2 and P4, the center velocity v3 is assumed to be generated between the positions P3 and P5, and so forth.

As shown in the lower row for ΣV1 of FIG. 8B, the individual center velocities v1 to v7 are represented so that these center velocities partially overlap each other. Thus, the average velocity v1 (ave) of the mover 30 as a whole is represented by the solid line, and the average velocity v1 (ave) can be leveled out. Moreover, since the dead points Pd can be eliminated, the knocking phenomenon can be eliminated from the moving mover 30. In this case, before a center velocity that occurs in a preceding step reaches zero, another center velocity can be newly generated in a succeeding step. That is to say, before electrostatic attraction force generated in the preceding step reaches the maximum level and stops the mover 30, electrostatic attraction force newly generated in the succeeding step can attract the mover 30 in the movement direction. Thus, the mover 30 can be smoothly moved.

Moreover, since the individual center velocities v1 to v7 are obtained by adding the center velocities, which occur in the electrodes 33a and 33b, magnitudes of the individual center velocities v1 to v7 can be increased. That is to say, attraction force that attracts the mover 30 is the resultant of electrostatic attraction force generated between the electrodes 33a and the electrodes 23 on the stator 20 side and electrostatic attraction force generated between the electrodes 33b and the electrodes 23 on the stator 20 side. Thus, larger electrostatic attraction force attracts the mover 30 in the movement direction.

Figure 9:
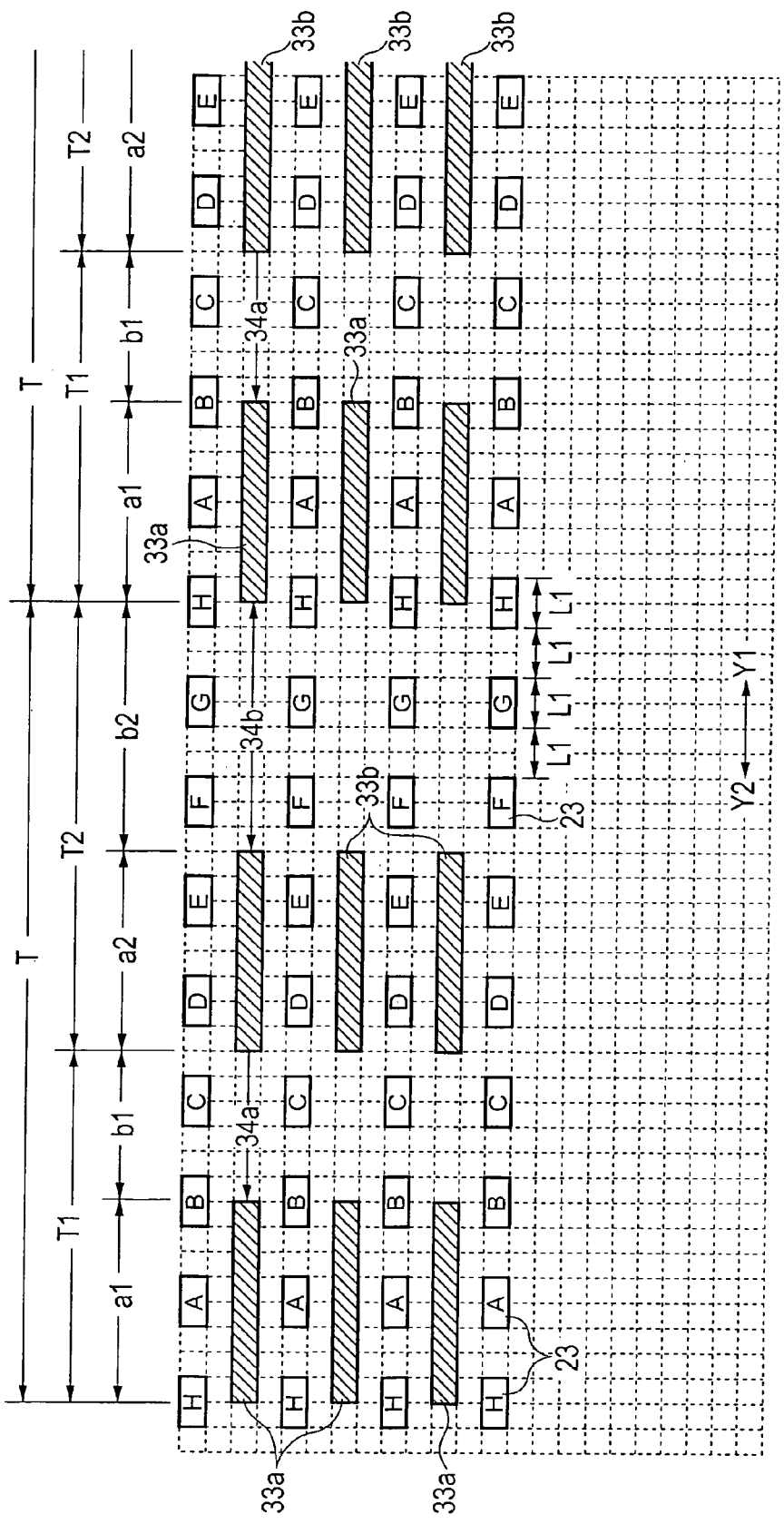
FIG. 9 is a plan view showing relationships between electrodes on a stator side and electrodes on a mover side in an electrostatic actuator according to a second embodiment of the present invention.
Figure 10:
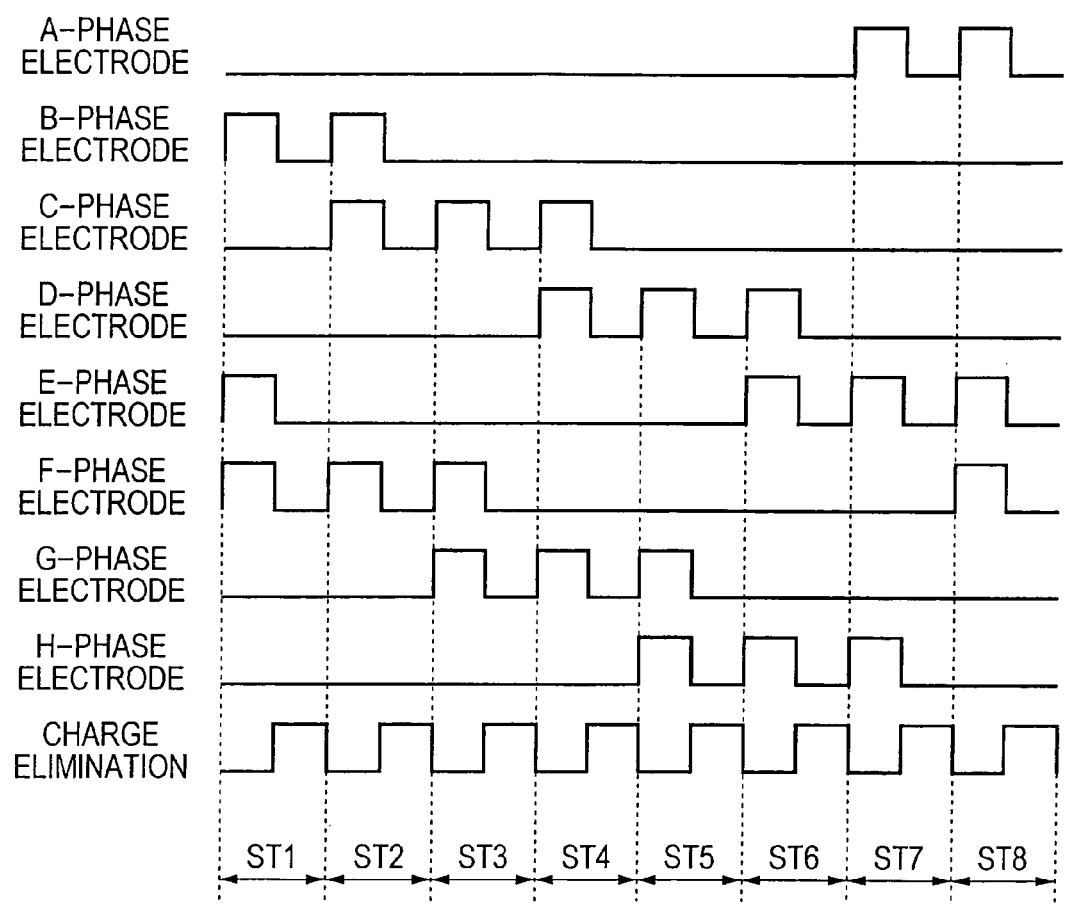
FIG. 10 is a timing diagram showing typical driving signals that are supplied to the electrostatic actuator according to the second embodiment.
Figure 11A:
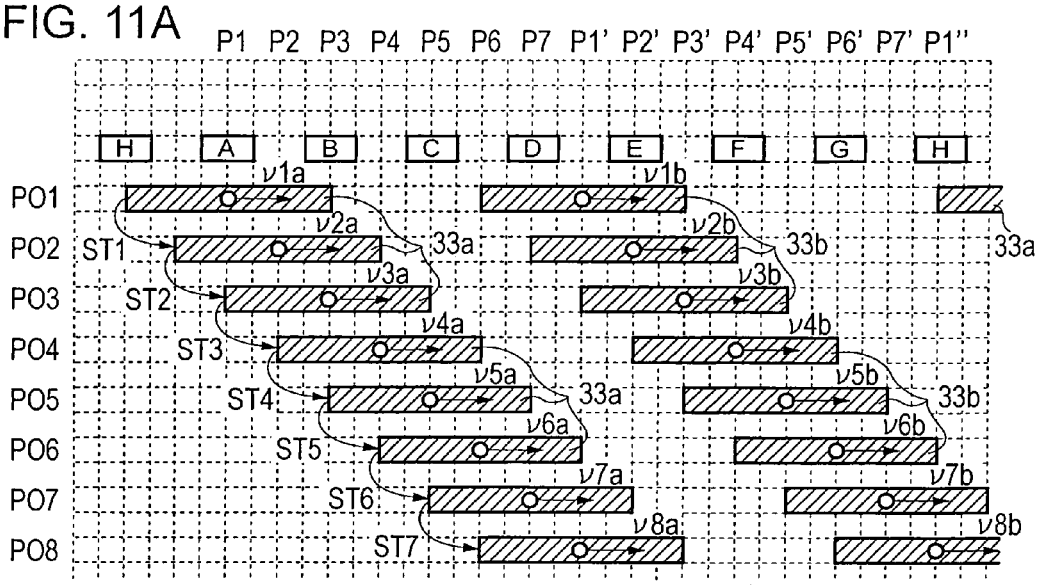
FIG. 11A is a plan view showing operation of the mover in individual steps.
Figure 11B:
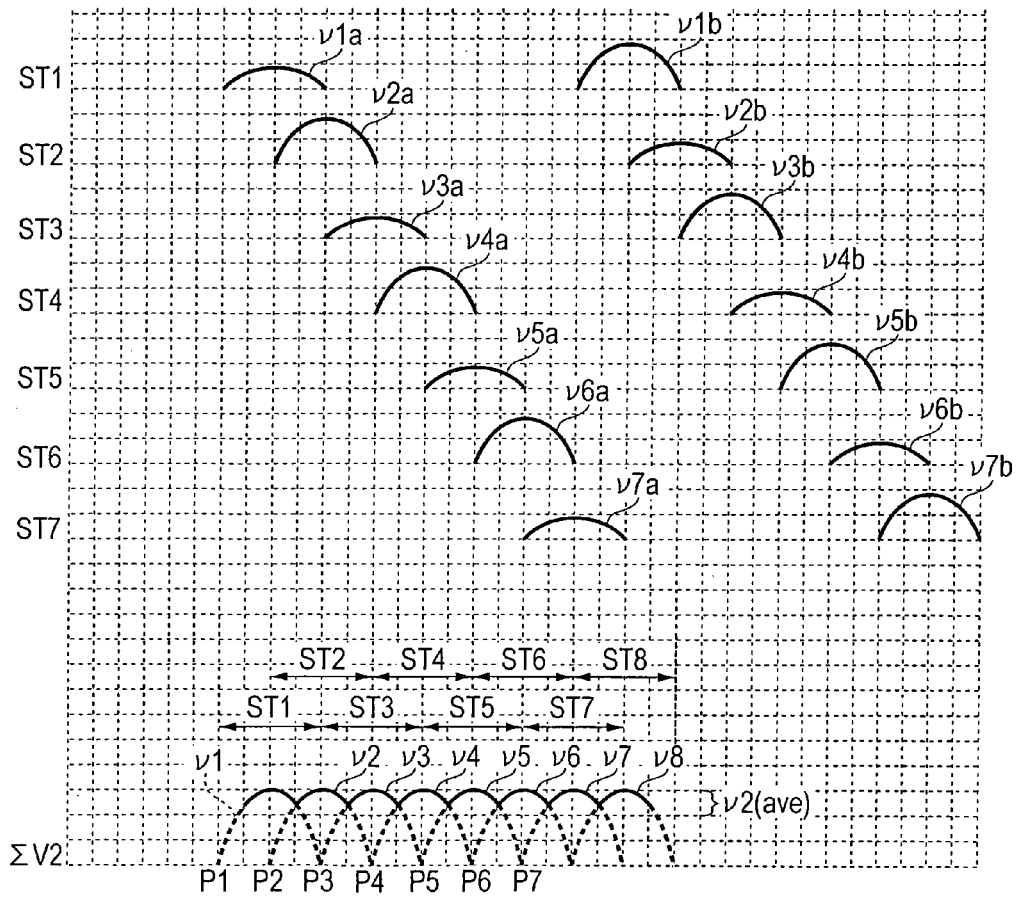
FIG. 11B is a chart showing changes in center velocities in the mover in the individual steps.

FIG. 9 is a plan view showing relationships between electrodes on a stator side and electrodes on a mover side in an electrostatic actuator according to a second embodiment of the present invention. FIG. 10 is a timing diagram showing typical driving signals that are supplied to the electrostatic actuator according to the second embodiment. FIG. 11 includes views showing basic operation of the electrostatic actuator 10B according to the second embodiment. FIG. 11A is a plan view showing operation of the mover in individual steps. FIG. 11B is a chart showing changes in center velocities in the mover in the individual steps.

The electrostatic actuator 10B according to the second embodiment has substantially the same structure as the electrostatic actuator 10A according to the first embodiment described above. Thus, the difference between the electrostatic actuators 10A and 10B will be mainly described.

In the electrostatic actuator 10B according to the second embodiment, the length of each electrode 23 on the stator 20 side and the length of a gap between any two adjacent electrodes 23 are the same as the moving distance L1, as shown in FIG. 9, as in the first embodiment. The electrostatic actuator 10B is different from the electrostatic actuator 10A in that the electrostatic actuator 10B employs an eight-phase drive system in which the stator 20 includes eight-phase electrode arrays, each array including eight driving electrodes, i.e., A-phase to H-phase electrodes.

In the electrostatic actuator 10B, the length a1 of electrodes 33a, out of the electrodes 33 on the mover 30 side, which constitute a first group is the same as the length a2 of electrodes 33b, out of the electrodes 33 on the mover 30 side, which constitute a second group (a1=a2), as in the electrostatic actuator 10A. However, the electrostatic actuator 10B is different from the electrostatic actuator 10A in that the length b1 of gaps 34a that constitute the first group is smaller than the length b2 of gaps 34b that constitute the second group (b1<b2) in the electrostatic actuator 10B. In the second embodiment, the difference between the lengths b1 and b2 is set to a value such that |b1−b2|=2·L1.

Accordingly, the total length T1 (=a1+b1) of the first group is smaller than the total length T2 (=a2+b2) of the second group. When the total length T1 of the first group is different from the total length T2 of the second group, as described above, i.e., when one group and another group that are adjacent to each other in the movement direction have different lengths, this drive system is referred to as a drive system in which electrodes are disposed at uneven intervals. That is to say, the electrostatic actuator 10B shown as the second embodiment in FIG. 9 is an eight-phase drive electrostatic actuator in which electrodes are disposed at uneven intervals.

As shown in FIG. 10, predetermined driving signals are applied to the electrodes 23, on the stator 20 side in the electrostatic actuator 10B, of A-phase to H-phase types. When the mover 30 moves in the Y1 direction, in step ST1, voltages are applied to the B-phase electrodes, the E-phase electrodes, and the F-phase electrodes. In step ST2, voltages are applied to the B-phase electrodes, the C-phase electrodes, and the F-phase electrodes. In step ST3, voltages are applied to the C-phase electrodes, the F-phase electrodes, and the G-phase electrodes. In step ST4, voltages are applied to the C-phase electrodes, the D-phase electrodes, and the G-phase electrodes. In step ST5, voltages are applied to the D-phase electrodes, the G-phase electrodes, and the H-phase electrodes. In step ST6, voltages are applied to the D-phase electrodes, the E-phase electrodes, and the H-phase electrodes. In step ST7, voltages are applied to the A-phase electrodes, the E-phase electrodes, and the H-phase electrodes. In step ST8, voltages are applied to the A-phase electrodes, the E-phase electrodes, and the F-phase electrodes. When a cycle of these steps is repeated in order of ST1, ST2, ST3, ST4, ST5, ST6, ST7, and ST8, the mover 30 can be sequentially moved in the Y1 direction and put to states PO1, PO2, PO3, PO4, PO5, PO6, PO7, and PO8, as shown in FIG. 11A.

In this case, as shown in FIG. 11B, in step ST1, a center velocity v1a, shown in a column at the left side of a row for step ST1, occurs in each electrode 33a, which is attracted by the B-phase electrode, and a center velocity v1b, shown in a column at the right side of the row for step ST1, occurs in each electrode 33b, which is attracted by the E-phase and F-phase electrodes. Thus, a center velocity v1 that occurs in the mover 30 as a whole in step ST1 is obtained by adding the center velocities v1a and v1b, i.e., v1=v1a+v1b. When the center velocity v1 is assumed to occur between positions P1 and P3, the center velocity v1 is shown in a column at the lower row for ΣV2 of FIG. 11B.

Similarly, in the state PO2, when driving signals are applied to the B-phase electrode, the C-phase electrode, and the F-phase electrode in step ST2, a center velocity v2a, shown in a row for step ST2, occurs in the electrode 33a, which is attracted by the B-phase and C-phase electrodes, and a center velocity v2b, shown in the row for step ST2, occurs in the electrode 33b, which is attracted by the F-phase electrode. Thus, a center velocity v2 (=v2a+v2b) that occurs in the mover 30 as a whole in step ST2 (between positions P2 and P4) is shown in a column at the lower row for ΣV2 of FIG. 11B.

Similarly, center velocities that occur in the mover 30 as a whole in steps ST3 to ST8 are indicated by v3, v4, v5, v6, v7, and v8, respectively, shown in the lower row for ΣV2 of FIG. 11B. The center velocities v1 to v8 partially overlap each other, as in the first embodiment described above. Thus, the average velocity v2 (ave) of the mover 30 as a whole can be leveled out, as represented by the solid line of ΣV2. Moreover, the dead points Pd do not occur, and thus, the knocking phenomenon can be prevented from occurring in the moving mover 30.

Figure 12:
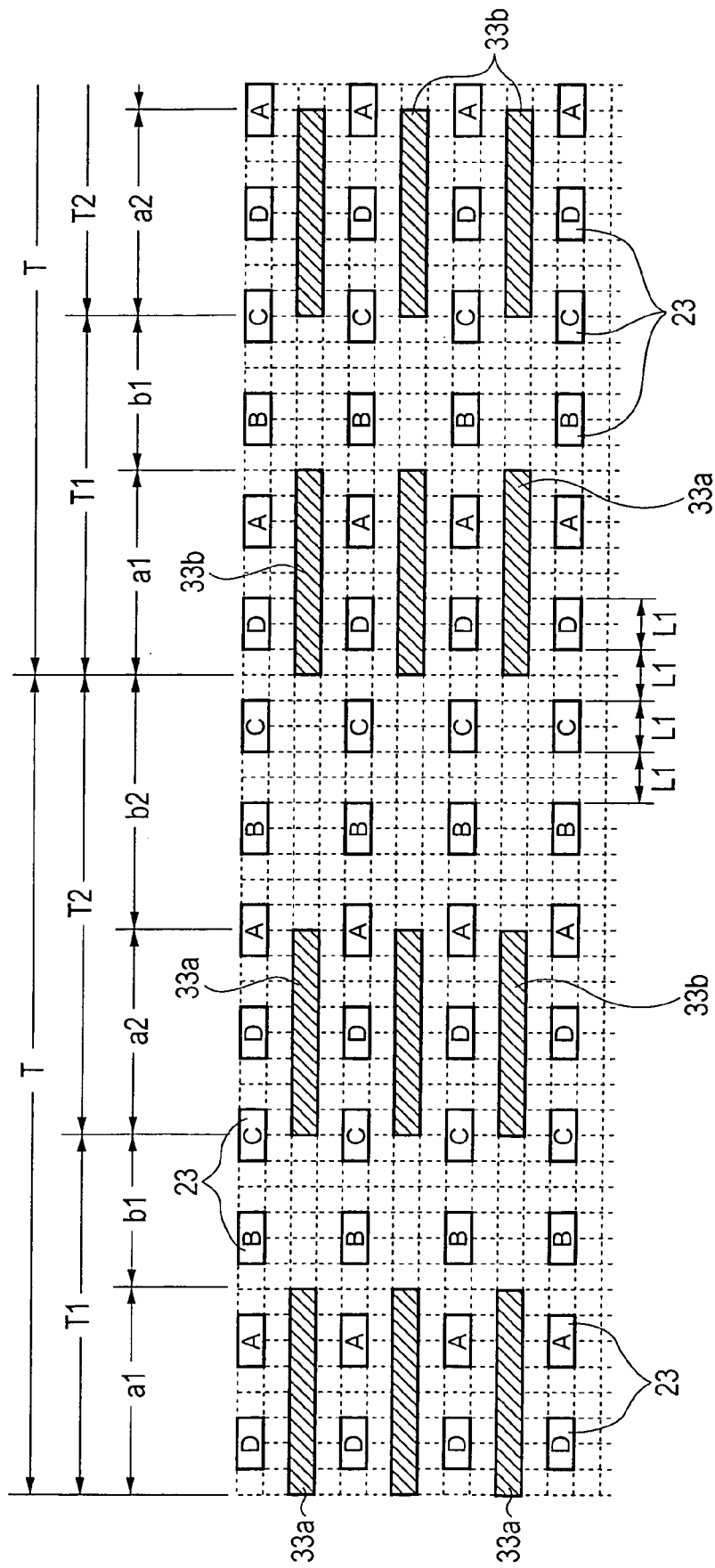
FIG. 12 is a plan view showing relationships between electrodes on a stator side and electrodes on a mover side in an electrostatic actuator according to a third embodiment of the present invention.
Figure 13:
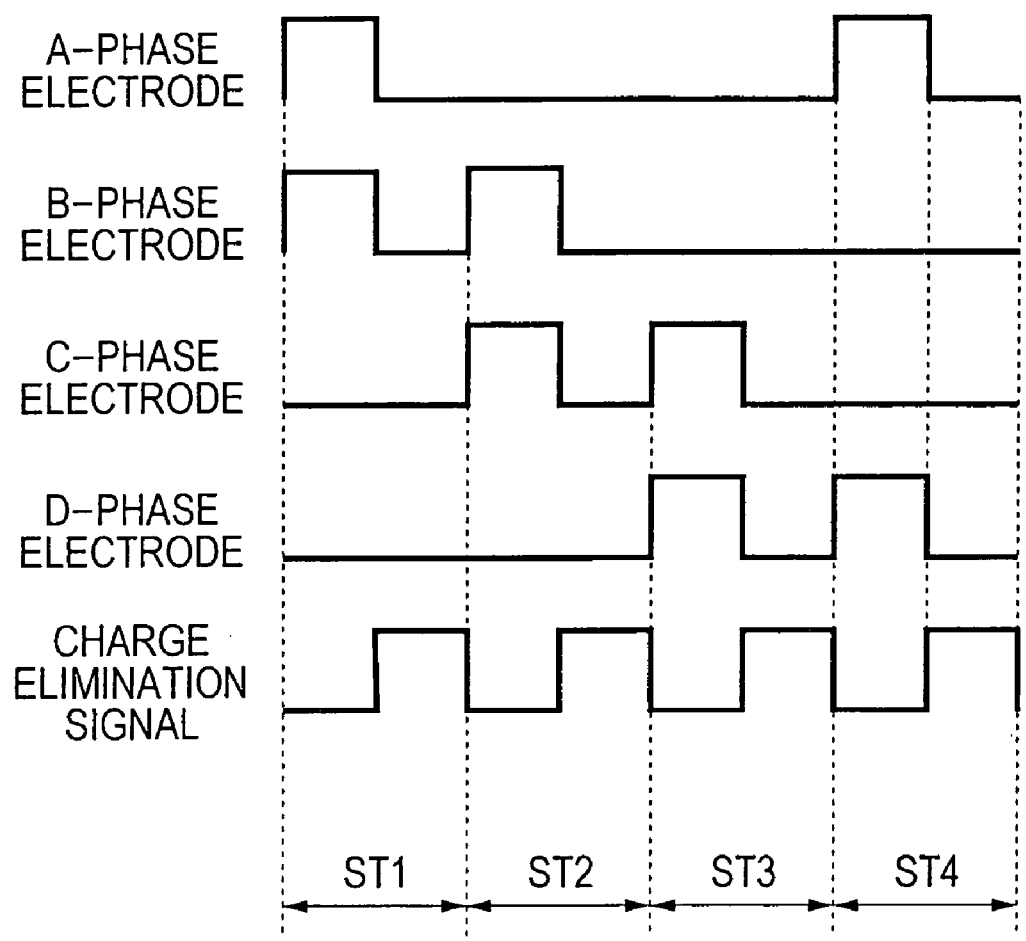
FIG. 13 is a timing diagram showing typical driving signals that are supplied to the electrostatic actuator according to the third embodiment.
Figure 14A:
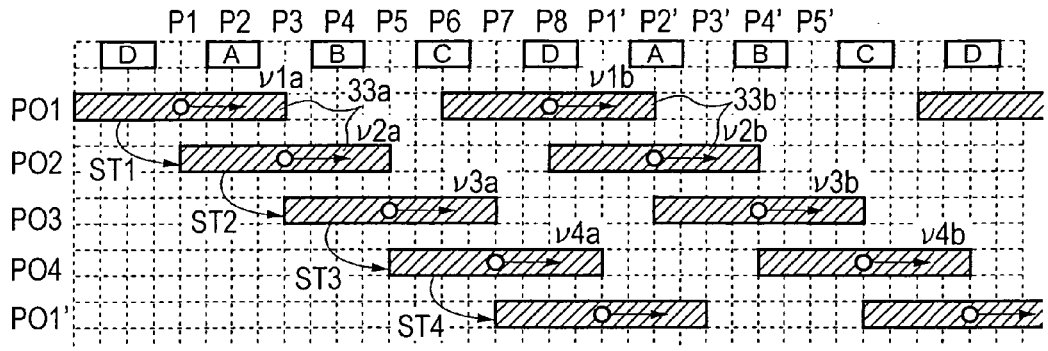
FIG. 14A is a plan view showing operation of the mover in individual steps.
Figure 14B:
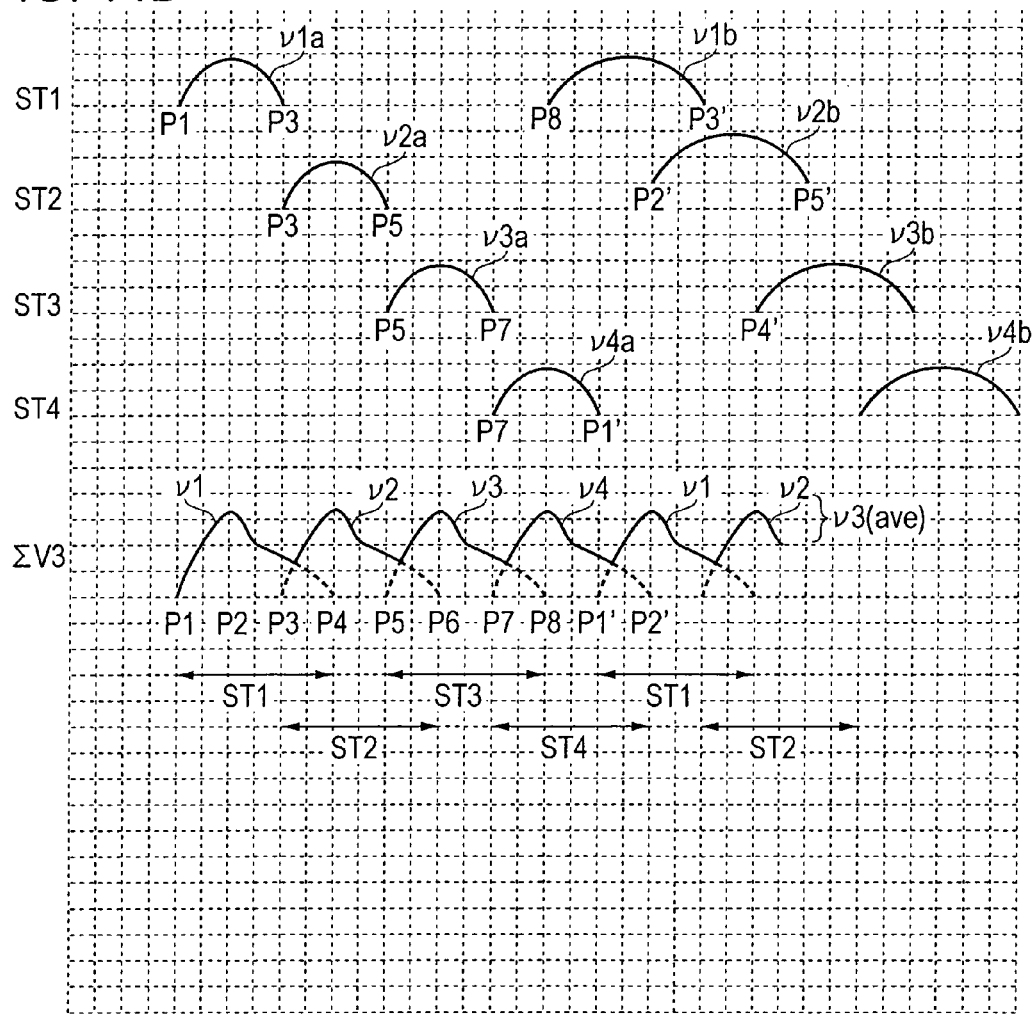
FIG. 14B is a chart showing changes in center velocities in the mover in the individual steps.

FIG. 12 is a plan view showing relationships between electrodes on a stator side and electrodes on a mover side in an electrostatic actuator according to a third embodiment of the present invention. FIG. 13 is a timing diagram showing typical driving signals that are supplied to the electrostatic actuator 10C according to the third embodiment. FIG. 14 includes views showing basic operation of the electrostatic actuator 10C according to the third embodiment. FIG. 14A is a plan view showing operation of the mover in individual steps. FIG. 14B is a chart showing changes in center velocities in the mover in the individual steps.

The electrostatic actuator 10C according to the third embodiment has substantially the same structure as the electrostatic actuator 10A according to the first embodiment and the electrostatic actuator 10B according to the second embodiment described above. Thus, the difference between the electrostatic actuator 10C and the electrostatic actuators 10A and 10B will be mainly described.

The electrodes 33 on the mover 30 side in the electrostatic actuator 10C and the electrodes 33 on the mover 30 side in the electrostatic actuator 10B according to the second embodiment have the same structure. That is to say, the electrostatic actuator 10C employs a drive system in which electrodes are disposed at uneven intervals.

On the other hand, in the third embodiment, the length of each electrode 23 on the stator 20 side and the length of a gap between any two adjacent electrodes 23 are the same as the moving distance L1, as shown in FIG. 12, as in the first and second embodiments described above. The third embodiment is different from the first and second embodiments in that the third embodiment employs an four-phase drive system in which the stator 20 includes four-phase electrode arrays, each array including four electrodes, i.e., A-phase, B-phase, C-phase, and D-phase electrodes.

That is to say, the electrostatic actuator 10C shown as the third embodiment in FIG. 12 is a four-phase drive electrostatic actuator in which electrodes are disposed at uneven intervals.

As shown in FIG. 13, predetermined driving signals are applied to the electrodes 23, on the stator 20 side in the electrostatic actuator 10C according to the third embodiment, of A-phase to D-phase types.

When the mover 30 moves in the Y1 direction, in step ST1, voltages are applied to the A-phase electrodes and the B-phase electrodes. In step ST2, voltages are applied to the B-phase electrodes and the C-phase electrodes. In step ST3, voltages are applied to the C-phase electrodes and the D-phase electrodes. In step ST4, voltages are applied to the A-phase electrodes and the D-phase electrodes. When a cycle of these steps is repeated in order of ST1, ST2, ST3, and ST4, the mover 30 can be sequentially moved in the Y1 direction and put to states PO1, PO2, PO3, PO4, and PO1', as shown in FIG. 14A.

In this case, as shown in FIG. 14B, in step ST1, a center velocity v1a, shown in a column at the left side of a row for step ST1, is generated in each electrode 33a by the A-phase electrode disposed at a position P2 and the B-phase electrode disposed at a position P4. Simultaneously, a center velocity v1b, shown in a column at the right side of the row for step ST1, is generated in each electrode 33b by the A-phase electrode disposed at a position P2' and the B-phase electrode disposed at a position P4'. Thus, a center velocity v1 that occurs in the mover 30 as a whole in step ST1 is obtained by adding the center velocities v1a and v1b, as described above, i.e., v1=v1a+v1b. When the center velocity v1 is assumed to occur between positions P1 and P4, the center velocity v1 is shown in the lower row for ΣV3 of FIG. 14B.

Similarly, in the state PO2, when driving signals are applied to the B-phase electrode and the C-phase electrode in step ST2, a center velocity v2a, shown in a column at the left side of a row for step ST2 in FIG. 14B, occurs in the electrode 33a, and a center velocity v2b, shown in a column at the right side of the row for step ST2, occurs in the electrode 33b. Thus, a center velocity v2 (=v2a+v2b) that occurs in the mover 30 as a whole in step ST2 (between positions P3 and P6) is shown in the lower row for ΣV3 of FIG. 14B.

Similarly, center velocities that occur in the mover 30 as a whole in steps ST3 and ST4 are indicated by v3 and v4, respectively, shown in ΣV3. The average velocity v3 (ave) of the mover 30 as a whole is represented by the solid line of ΣV3, as in the first and second embodiments described above.

Variation in the average velocity v3 (ave) achieved in the mover 30 in the electrostatic actuator 10C according to the third embodiment can be smaller than variation in a velocity achieved in the mover 30 in the electrostatic actuator, which employs the general drive system shown in FIG. 7. However, variation in the average velocity v3 (ave) achieved in the mover 30 in the electrostatic actuator 10C is larger than variation in the average velocity v1 (ave) and the average velocity v2 (ave) respectively achieved in the mover 30 in the electrostatic actuator 10A according to the first embodiment and the mover 30 in the electrostatic actuator 10B according to the second embodiment.

However, in the electrostatic actuator 10A according to the first embodiment and the electrostatic actuator 10B according to the second embodiment, the mover 30 is moved the moving distance L1 in each step (each time driving signals are applied). On the other hand, in the electrostatic actuator 10C according to the third embodiment, the mover 30 is moved a distance twice as large as the moving distance L1 (an integral multiple of the length of the electrodes 23 on the stator 20 side) in each step (each time driving signals are applied). That is to say, the electrostatic actuator 10C according to the third embodiment is suitable for rough feed, and the electrostatic actuator 10A according to the first embodiment and the electrostatic actuator 10B according to the second embodiment are suitable for fine feed.

Moreover, in the electrostatic actuator 10B according to the second embodiment, the number of required phase types of electrodes is eight. In the electrostatic actuator 10C according to the third embodiment, the number of required phase types of electrodes can be reduced to four. Thus, the structure of the driving signal supply unit, wiring lines formed on the stator 20, for example, a wiring pattern that connects the conductive parts 24 to the output of the driving signal supply unit, and the like can be simplified.

Moreover, the dead points Pd do not occur, as in the first and second embodiments, and thus, the knocking phenomenon can be prevented from occurring in the moving mover 30.

When the eight-phase drive system according to the second embodiment is used in combination with the driving technique according to the third embodiment, fine feed and rough feed can be readily selected only by changing combinations of driving signals that are applied to the electrodes 23 on the stator 20 side.

For example, a lens feed unit equipped with a lens may be provided on the mover 30 and move the lens in the optical axis direction so that the lens feed unit is used as a camera unit that performs automatic focus control. In this case, when the lens is moved from a waiting position, rough feed can shorten the time required to move the lens by increasing the movement speed of the lens. When the lens is approaching a target position (a focusing position), the movement speed of the lens can be decreased to accurately stop the lens at the target position by switching from rough feed to fine feed, thereby achieving accurate focusing.

Moreover, in the electrostatic actuator 10 described above according to the present invention, the movement speed of the mover is variable. Thus, a camera unit that performs focusing in a short time can be provided.

In the embodiments described above, the electrodes, which constitute the stator-side electrode group, on the stator 20 side and the gaps between these electrodes have the length L1, and the lengths of the electrodes 33, which constitute the mover-side electrode group, on the mover 30 side and the gaps 34 between the electrodes 33 are larger than the length L1. The present invention is not limited to this case, and the lengths of the electrodes 33 on the mover 30 side and the gaps 34 between the electrodes 33 may be smaller than the length L1.

What is claimed is:

1. An electrostatic actuator comprising:
   a stator that includes a stator-side electrode group, the stator-side electrode group including a plurality of arranged electrodes and gaps therebetween;
   a mover freely movable in a predetermined movement direction, the mover including a mover-side electrode group, the mover-side electrode group including a plurality of electrodes and gaps therebetween, the plurality of electrodes opposing the individual electrodes included in the stator-side electrode group;
   a guide instrument that guides the mover in the movement direction; and
   a driving signal supply unit that generates driving signals having a predetermined number of phases and that applies the generated driving signals between the stator-side electrode group and the mover-side electrode group,
   wherein, in one electrode group of the stator-side electrode group and the mover-side electrode group, the electrodes and gaps have the same length in the movement direction, and
   wherein the other electrode group includes a first group and a second group alternately disposed in the movement direction, each of the first group and the second group including an electrode and a gap, a length of the first group and a length of the second group in the movement direction being different from each other.

2. The electrostatic actuator according to claim 1, wherein, in a case where one pitch is defined as an interval that is obtained by adding the length of the first group in the movement direction and the length of the second group in the movement direction, a set of the electrodes and the gaps within the one pitch is repeatedly disposed in the movement direction in the other electrode group.

3. The electrostatic actuator according to claim 1, wherein, in a case where one pitch is defined as an interval that is obtained by adding the length of the first group in the movement direction and the length of the second group in the movement direction, the first group and the second group being provided in the other electrode group, the one electrode group includes n electrodes, where n is an even number other than zero, within an interval corresponding to the one pitch, and the number of phases of the driving signal supply unit is n or n/2.

4. The electrostatic actuator according to claim 1, wherein an amount of movement of the mover each time the driving signals are applied is an integral multiple of the length of the electrodes included in the one electrode group.

5. The electrostatic actuator according to claim 1, wherein the mover-side electrode group is the one electrode group in which the electrodes and gaps have the same length in the movement direction and are alternately disposed in the movement direction, and the stator-side electrode group is the other electrode group including the first group and the second group.

6. The electrostatic actuator according to claim 1, wherein both side faces of the individual electrodes included in the mover-side electrode group oppose the individual electrodes included in the stator-side electrode group, the both side faces being parallel to the movement direction.

7. An electrostatic actuator comprising:
   a stator that includes a stator-side electrode group, the stator-side electrode group including a plurality of arranged electrodes and gaps therebetween;
   a mover freely movable in a predetermined movement direction, the mover including a mover-side electrode group, the mover-side electrode group including a plurality of electrodes and gaps therebetween, the plurality of electrodes opposing the individual electrodes included in the stator-side electrode group;
   guide instrument that guides the mover in the movement direction; and
   a driving signal supply unit that generates driving signals having a predetermined number of phases and that applies the generated driving signals between the stator-side electrode group and the mover-side electrode group,
   wherein, in one electrode group of the stator-side electrode group and the mover-side electrode group, the electrodes and gaps have the same length in the movement direction, and
   wherein the other electrode group includes a first group and a second group alternately disposed in the movement direction, each of the first group and the second group including an electrode and a gap,
   wherein one of the electrodes provided in the other electrode group and two or more of the electrodes provided in the one electrode group face each other,
   wherein in the other electrode group, a pitch is defined as an interval obtained by adding a length of the first group and a length of the second group in the movement direction, the length of the first group and the length of the second group in the movement direction being the same, and
   wherein the one electrode group includes seven electrodes in the movement direction within an interval corresponding to the one pitch.

8. The electrostatic actuator according to claim 7, wherein the length of the electrode in the first group is the same as that in the second group, and the length of the gap in the first group is the same as that in the second group, the length of the electrode being different from the length of the gap.

9. The electrostatic actuator according to claim 7, wherein an amount of movement of the mover each time the driving signals are applied is an integral multiple of the length of the electrodes included in the one electrode group.

10. The electrostatic actuator according to claim 7, wherein the mover-side electrode group is the one electrode group in which the electrodes and gaps have the same length in the movement direction and are alternately disposed in the movement direction, and the stator-side electrode group is the other electrode group including the first group and the second group.

11. The electrostatic actuator according to claim 7, wherein both side faces of the individual electrodes included in the mover-side electrode group oppose the individual electrodes included in the stator-side electrode group, the both side faces being parallel to the movement direction.

12. The electrostatic actuator according to claim 7, wherein, in the one electrode group, the seven electrodes are sequentially driven by the driving signals such that three electrodes among the seven electrodes are simultaneously driven at a time.

* * * * *